(12) United States Patent
Um et al.

(10) Patent No.: US 10,673,576 B2
(45) Date of Patent: Jun. 2, 2020

(54) OPERATING METHOD OF COMMUNICATION NODE IN NETWORK SUPPORTING LICENSED AND UNLICENSED BANDS

(71) Applicant: ELECTRONICS AND TELECOMMUNICATIONS RESEARCH INSTITUTE, Daejeon (KR)

(72) Inventors: Jung Sun Um, Daejeon (KR); Sung Jin Yoo, Daejeon (KR); Hoi Yoon Jung, Daejeon (KR); Seung Keun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 172 days.

(21) Appl. No.: 15/576,739

(22) PCT Filed: Aug. 5, 2016

(86) PCT No.: PCT/KR2016/008666
§ 371 (c)(1),
(2) Date: Nov. 24, 2017

(87) PCT Pub. No.: WO2017/030310
PCT Pub. Date: Feb. 23, 2017

(65) Prior Publication Data
US 2018/0175975 A1  Jun. 21, 2018

(30) Foreign Application Priority Data

Aug. 14, 2015  (KR) .................. 10-2015-0114975
Sep. 24, 2015  (KR) .................. 10-2015-0135381

(Continued)

(51) Int. Cl.
*H04L 1/18* (2006.01)
*H04W 24/10* (2009.01)
(Continued)

(52) U.S. Cl.
CPC ............. *H04L 1/1816* (2013.01); *H04L 1/18* (2013.01); *H04W 16/14* (2013.01); *H04W 24/10* (2013.01); *H04W 72/14* (2013.01); *H04W 74/08* (2013.01)

(58) Field of Classification Search
CPC ....... H04L 1/1816; H04L 1/18; H04L 1/1812; H04W 16/14; H04W 24/10; H04W 72/14;
(Continued)

(56) References Cited

U.S. PATENT DOCUMENTS 6,965,942 B1   11/2005  Young et al.
2002/0154653 A1  10/2002  Benveniste
(Continued)

FOREIGN PATENT DOCUMENTS

WO  WO 2013/006006 A2  1/2013
WO  WO 2014/123379 A1  8/2014
WO  WO 2017/126730 A1  7/2017

OTHER PUBLICATIONS

Juang et al., Enhanced Chase Combining HARQ with ICI and IAI Mitigation for MIMO-OFDM Systems, IEEE, vol. 58, Issue: 8, Pertinent pp. 4645-4649 (Year: 2009).*
(Continued)

*Primary Examiner* — April Y Blair
*Assistant Examiner* — Dipakkumar B Gandhi
(74) *Attorney, Agent, or Firm* — NSIP Law

(57) ABSTRACT

An operating method of a communication node in a network supporting licensed and unlicensed bands is disclosed. An operation method of a base station comprises the steps of: transmitting a PDSCH to a UE in an unlicensed band;
(Continued)

receiving an HARQ response to the PDSCH from the UE; and determining a size of a CW on the basis of a proportion of NACKs in HARQ responses. Therefore, a performance of a communication network can be improved.

18 Claims, 21 Drawing Sheets

(30) Foreign Application Priority Data

Nov. 5, 2015 (KR) .......................... 10-2015-0155376
Nov. 23, 2015 (KR) .......................... 10-2015-0163946

(51) Int. Cl.
*H04W 72/14* (2009.01)
*H04W 16/14* (2009.01)
*H04L 1/02* (2006.01)
*H04W 74/08* (2009.01)

(58) Field of Classification Search
CPC ............ H04W 74/08; H04W 74/0833; H04W 74/006; H04W 72/0453; H04W 28/04; H04W 74/0841; H04W 74/0825; H04W 74/0808; H04W 74/008; H04W 74/002
See application file for complete search history.

(56) References Cited

U.S. PATENT DOCUMENTS

| | | |
|---|---|---|
| 2004/0170150 A1 | 9/2004 | Guo et al. |
| 2004/0264423 A1 | 12/2004 | Ginzburg et al. |
| 2005/0141547 A1 | 6/2005 | Cho et al. |
| 2007/0076741 A1 | 4/2007 | Lee et al. |
| 2008/0212604 A1 | 9/2008 | Liu |
| 2009/0213802 A1* | 8/2009 | Miki .................... H04B 7/2621 370/329 |
| 2010/0195572 A1 | 8/2010 | Sadek et al. |
| 2010/0290406 A1* | 11/2010 | Miki .................... H04B 7/2621 370/329 |
| 2011/0002309 A1* | 1/2011 | Park ...................... H04L 1/1607 370/335 |
| 2012/0026954 A1* | 2/2012 | Wang .................... H04L 5/0023 370/329 |
| 2012/0213065 A1 | 8/2012 | Koo et al. |
| 2013/0308550 A1* | 11/2013 | Yin ........................ H04L 5/001 370/329 |
| 2014/0112289 A1* | 4/2014 | Kim ...................... H04W 16/14 370/329 |
| 2014/0198642 A1 | 7/2014 | Barriac et al. |
| 2014/0286243 A1* | 9/2014 | Yamada .............. H04W 72/042 370/329 |
| 2014/0378157 A1 | 12/2014 | Wei et al. |
| 2015/0023315 A1 | 1/2015 | Yerramalli et al. |
| 2015/0098397 A1* | 4/2015 | Damnjanovic ........ H04W 74/08 370/329 |
| 2016/0081047 A1 | 3/2016 | Kwak et al. |

OTHER PUBLICATIONS

"DL LBT Operation with Variable Contention Window Size," LG Electronics, Fukuoka, Japan, May 29, 2015 (8 pages in English).
International Search Report dated Nov. 28, 2016 in corresponding International Application No. PCT/KR2016/000866 (2 pages in English; 2 pages in Korean).

* cited by examiner

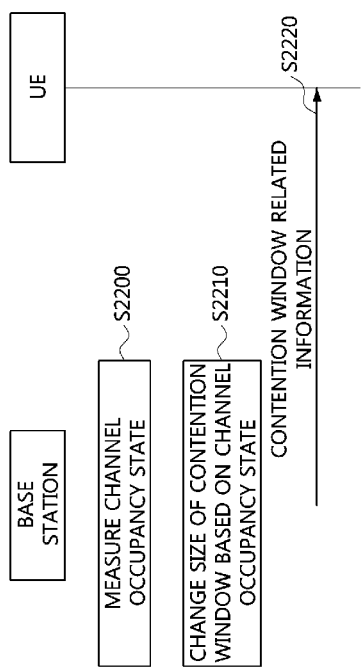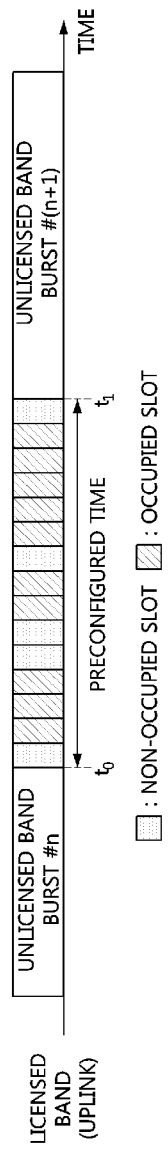

OPERATING METHOD OF COMMUNICATION NODE IN NETWORK SUPPORTING LICENSED AND UNLICENSED BANDS

CROSS REFERENCE TO RELATED APPLICATIONS

This application is a U.S. National Stage Application of International Application No. PCT/KR2016/008666, filed on Aug. 5, 2016, which claims the benefit under 35 USC 119(a) and 365(b) of Korean Patent Application No. 10-2015-0114975, filed on Aug. 14, 2015, Korean Patent Application No. 10-2015-0135381, filed on Sep. 24, 2015, Korean Patent Application No. 10-2015-0155376, filed on Nov. 5, 2015, and Korean Patent Application No. 10-2015-0163946, filed on Nov. 23, 2015 in the Korean Intellectual Property Office.

TECHNICAL FIELD

The present invention relates to communication technologies for supporting licensed and unlicensed bands, and more particularly to channel access technologies for a communication node supporting a Licensed Assisted Access (LAA).

BACKGROUND ART

Various wireless communication technologies are being developed in accordance with advancement of information communication technologies. Wireless communication technologies may be generally classified into technologies using licensed bands and technologies using unlicensed bands (e.g., industrial-scientific-medical (ISM) band) according to bands used by respective technologies. Since a licensed band is exclusively used by a specific operator, the technology using the licensed band may provide better reliability, communication quality, etc. than that using an unlicensed band.

There exists, as a representative cellular communication technology using a licensed band, a Long Term Evolution (LTE) or LTE-Advanced (LTE-A) standardized in a 3rd generation partnership project (3GPP). Thus, a base station or a user equipment (UE) supporting LTE or LTE-A may transmit or receive signals through a licensed band. Also, there exists, as a representative wireless communication technology using an unlicensed band, a wireless local area network (WLAN) defined in IEEE 802.11. Thus, an access point or a station supporting the WLAN may transmit or receive signals through the unlicensed band.

Meanwhile, as mobile traffics are increasing explosively, additional licensed bands are required in order to process such the increasing mobile traffics through licensed bands. However, licensed bands are limited resources. Since a licensed band is obtained usually through an auction held among operators, astronomical investment may be demanded for obtaining an additional licensed band. In order to resolve the above-described problem, a method for providing LTE or LTE-A services through an unlicensed band may be considered.

In the case that the LTE (or LTE-A) services are provided through the unlicensed band, coexistence with the communication nodes (e.g., access points, stations, etc.) supporting the WLAN is needed. For the coexistence in the unlicensed band, a communication node (e.g., base station, UE, etc.) supporting the LTE (or LTE-A) may occupy the unlicensed band based on an LBT (listen before talk) scheme. For example, a communication node supporting the LTE (or LTE-A) may determine a contention window by performing a random backoff operation, randomly select a backoff value within the determined contention window, and occupy the unlicensed band when a status of the unlicensed band is idle for a time corresponding to the selected backoff value.

Here, the size of the contention window may be changed statically or dynamically. However, a procedure for changing the size of the contention window in the unlicensed band where the LTE (or LTE-A) services are provided is not clearly defined. Further, there is a problem that the size of the contention window is changed without considering the status of the unlicensed band.

Meanwhile, this description on the related arts is written for understanding of the background of the present disclosure. Thus, information on other than conventional technologies, which are already known to those skilled in this technology domain to which the technologies of the present disclosure belong, may be included in this description.

DISCLOSURE

Technical Problem

The purpose of the present invention for resolving the above-described problem is to provide a method of changing the size of contention window in an unlicensed band.

Technical Solution

In order to achieve the above-described purpose, an aspect of the present invention may provide an operation method of a base station in a communication network.

The operation method comprises transmitting a physical downlink shared channel (PDSCH) to a user equipment (UE) through an unlicensed band; receiving a hybrid automatic repeat request (HARQ) response to the PDSCH from the UE; and determining a size of a contention window (CW) based on a negative acknowledgement (NACK) ratio of HARQ responses.

Here, the base station may transmit the PDSCHs in consecutive subframes, and the size of the CW may be determined based on the HARQ response to the PDSCH transmitted through a first subframe among the consecutive subframes when a size of the first subframe is 1 millisecond.

Here, the base station may transmit the PDSCHs in consecutive subframes, the size of the CW may be determined based on the HARQ responses to the PDSCHs transmitted through a first subframe (subframe #n) and a second subframe (subframe #(n+1)) among the consecutive subframes when a size of the first subframe (subframe #n) is less than 1 millisecond, and n is an integer equal to or greater than 0.

Here, when the PDSCH includes two codewords, the HARQ response may include HARQ responses for the two respective codewords.

Here, the HARQ response may be a bundled HARQ response for a plurality subframes among the consecutive subframes.

Here, the size of the CW may be increased when the NACK ratio is equal to or greater than a predetermined threshold.

Here, the size of the CW may be decreased when the NACK ratio is less than a predetermined threshold.

Here, the size of the CW may be determined based on the NACK ratio which is a ratio of a sum of NACKs, discontinuous transmissions (DTXs), and ANYs.

Here, the operation method may further comprises transmitting a PDSCH to the UE based on the changed size of the CW through the unlicensed band.

In order to achieve the above-described purpose, an aspect of the present invention may provide a base station supporting an unlicensed band. The base station comprises a processor and a memory storing at least one instruction executed by the processor, wherein the at least one instruction is configured to: transmit a physical downlink shared channels (PDSCH) to a user equipment (UE) through an unlicensed band; receive a hybrid automatic repeat request (HARQ) response to the PDSCH from the UE; and determine a size of a contention window (CW) based on a negative acknowledgement (NACK) ratio of HARQ responses.

Here, the PDSCHs may be transmitted through consecutive subframes, and the size of the CW may be determined based on the HARQ response to the PDSCH transmitted through a first subframe among the consecutive subframes when a size of the first subframe is 1 millisecond.

Here, the PDSCHs may be transmitted through consecutive subframes, the size of the CW may be determined based on the HARQ responses to the PDSCHs transmitted through a first subframe (subframe #n) and a second subframe (subframe #(n+1)) among the consecutive subframes when a size of the first subframe (subframe #n) is less than 1 millisecond, and n is an integer equal to or greater than 0.

Here, when the PDSCH includes two codewords, the HARQ response may include HARQ responses for the two respective codewords.

Here, the HARQ response may be a bundled HARQ response for a plurality subframes among the consecutive subframes.

Here, the size of the CW may be increased when the NACK ratio is equal to or greater than a predetermined threshold.

Here, the size of the CW may be decreased when the NACK ratio is less than a predetermined threshold.

Here, the size of the CW may be determined based on the NACK ratio which is a ratio of a sum of NACKs, discontinuous transmissions (DTXs), and ANYs.

Here, the at least one instruction may be further configured to transmit a PDSCH to the UE based on the changed size of the CW through the unlicensed band.

Advantageous Effects

According to the present invention, the contention window (for example, the size of the contention window) may be changed based on the occupation state of the unlicensed band. Also, the contention window may be changed based on the hybrid automatic repeat request (HARQ) response to data transmitted through the unlicensed band. In this case, since the HARQ response to the first subframe or the HARQ responses to the first subframe and a plurality of subframes contiguous to the first subframe among a plurality of subframes included in an unlicensed band burst are used, influence due to transmission latency of the HARQ response can be minimized. Also, the contention window may be changed based on collision-aware information on the data transmitted through the unlicensed band. The communication node can perform communications using the changed contention window in the unlicensed band. Thus, the performance of the communication network can be enhanced.

DESCRIPTION OF DRAWINGS

FIG. 22 is a sequence chart illustrating a third exemplary embodiment of a method of changing a contention window size based on collision-aware information.

FIG. 23 is a timing diagram illustrating a channel occupancy state of an unlicensed band.

MODE FOR INVENTION

Figure 1:
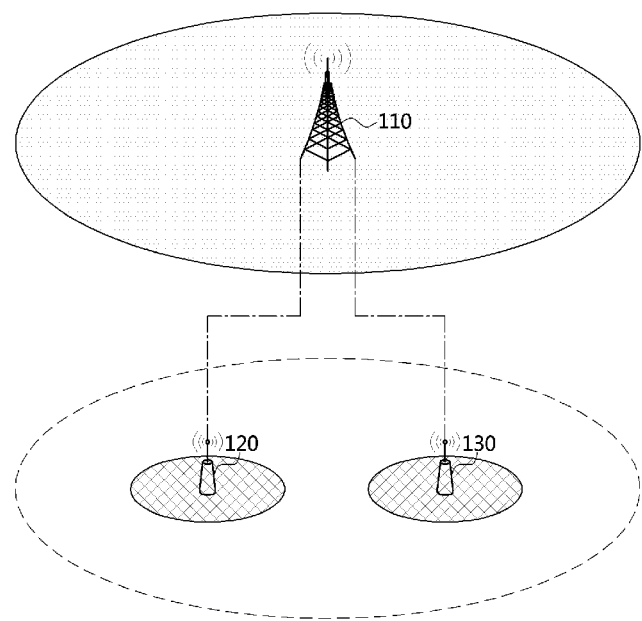
FIG. 1 is a conceptual diagram illustrating a first exemplary embodiment of a wireless communication network.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first exemplary embodiment of a wireless communication network.

Referring to FIG. 1, a first base station 110 may support cellular communications (e.g., Long Term Evolution (LTE), LTE-Advanced (LTE-A), Licensed Assisted Access (LAA), etc.) standardized in a 3rd Generation Partnership Project (3GPP). The first base station 110 may support technologies such as a Multiple Input Multiple Output (MIMO) (e.g., Single-User (SU)-MIMO, Multi-User (MU)-MIMO, massive MIMO, etc.), a Coordinated multi-point transmission/reception (CoMP), a Carrier Aggregation (CA), etc. The first base station 110 may operate in a licensed band (F1), and form a macro cell. The first base station 100 may be connected to other base stations (e.g., a second base station 120, a third base station 130, etc.) through ideal backhaul links or non-ideal backhaul links.

The second base station 120 may be located in coverage of the first base station 110. Also, the second base station 120 may operate in an unlicensed band F3, and form a small cell. The third base station 130 may also be located in coverage of the first base station 110. The third base station 130 may operate in the unlicensed band F3, and form a small cell. The second base station 120 and the third base station 130 each may support a Wireless Local Area Network (WLAN) standardized in an Institute of Electrical and Electronics Engineers (IEEE) 802.11. Each user equipment (UE) connected to the first base station 110 may transmit and receive signals through a CA using the licensed band F1 and the unlicensed band F3.

Figure 2:
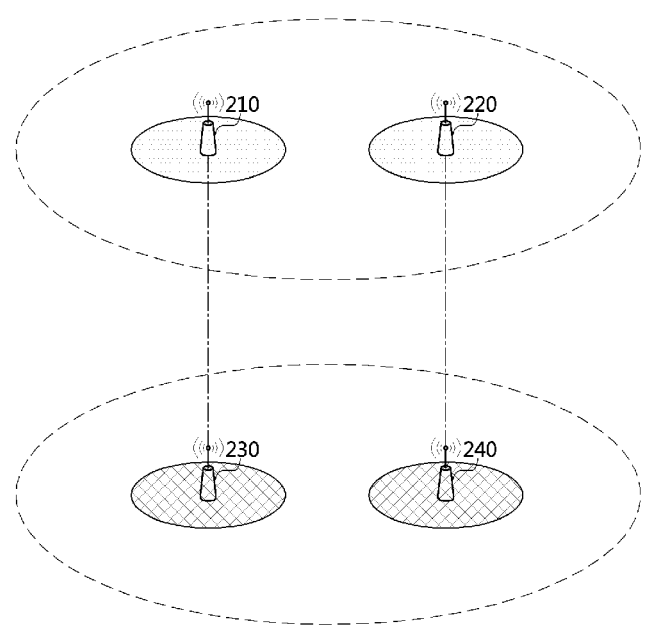
FIG. 2 is a conceptual diagram illustrating a second exemplary embodiment of a wireless communication network.

FIG. 2 is a conceptual diagram illustrating a second exemplary embodiment of a wireless communication network.

Referring to FIG. 2, each of a first base station 210 and a second base station 220 may support cellular communications (e.g., LTE, LTE-A, LAA, etc.). Each of the first base station 210 and the second base station 220 may support MIMO (e.g. SU-MIMO, MU-MIMO, massive MIMO, etc.), CoMP, CA, etc. Also, each of the base stations 210 and 220 may operate in the licensed band F1, and form each small cell. Each of the base stations 210 and 220 may be located in coverage of a base station forming a macro cell. The first base station 210 may be connected with a third base station 230 through an ideal backhaul link or a non-ideal backhaul link. Also, the second base station 220 may be connected with a fourth base station 240 through an ideal backhaul link or a non-ideal backhaul link.

The third base station 230 may be located in coverage of the first base station 210. The third base station 230 may operate in the unlicensed band F3, and form a small cell. The fourth base station 240 may be located in coverage of the second base station 220. The fourth base station 240 may operate in the unlicensed band F3, and form a small cell. Each of the base stations 230 and 240 may support WLAN standardized in IEEE 802.11. Each of the first base station 210, a UE connected to the first base station 210, the second base station 220, and a UE connected to the second base station 220 may transmit and receive signals through a CA using the licensed band F1 and the unlicensed band F3.

Figure 3:
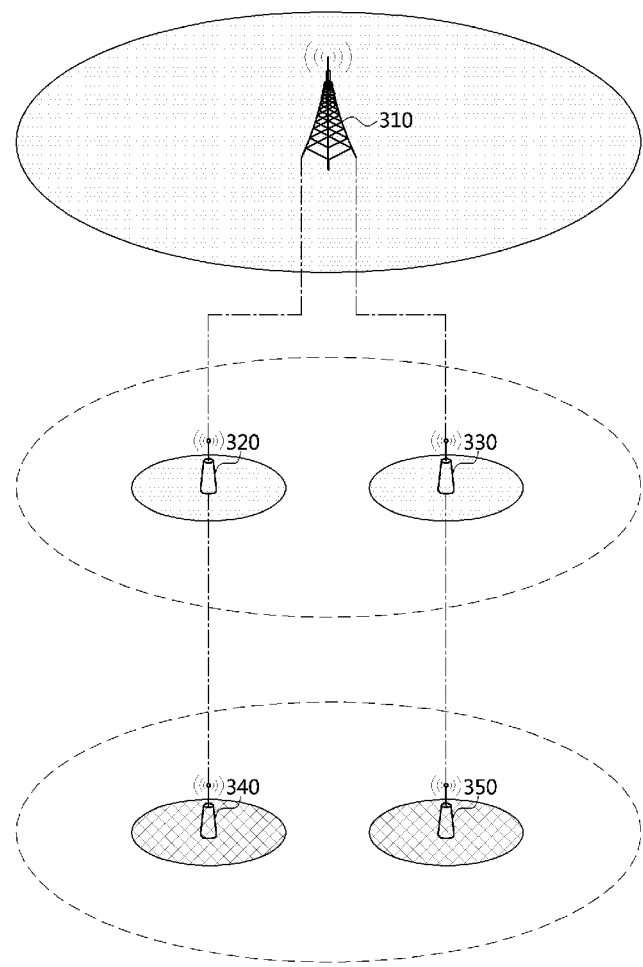
FIG. 3 is a conceptual diagram illustrating a third exemplary embodiment of a wireless communication network.

FIG. 3 is a conceptual diagram illustrating a third exemplary embodiment of a wireless communication network.

Referring to FIG. 3, each of a first base station 310, a second base station 320, and a third base station 330 may support cellular communications (e.g., LTE, LTE-A, LAA, etc.). Each of the first base station 310, the second base station 320, and the third base station 330 may support MIMO (e.g., SU-MIMO, MU-MIMO, massive MIMO, etc.), CoMP, CA, etc. The first base station 310 may operate in the licensed band F1, and form a macro cell. The first base station 310 may be connected to other base stations (e.g., the second base station 320, the third base station 330, etc.) through ideal backhaul links or non-ideal backhaul links. The second base station 320 may be located in coverage of the first base station 310. The second base station 320 may operate in the licensed band F1, and form a small cell. The third base station 330 may be located in coverage of the first base station 310. The third base station 330 may operate in the licensed band F1, and form a small cell.

The second base station 320 may be connected with a fourth base station 340 through an ideal backhaul link or a non-ideal backhaul link. The fourth base station 340 may be located in coverage of the second base station 320. The fourth base station 340 may operate in the unlicensed band F3, and form a small cell. The third base station 330 may be connected with a fifth base station 350 through an ideal backhaul link or a non-ideal backhaul link. The fifth base station 350 may be located in coverage of the third base station 330. The fifth base station 350 may operate in the unlicensed band F3, and form a small cell. Each of the base stations 340 and 350 may support WLAN standardized in IEEE 802.11.

Each of the first base station 310, a UE (not-depicted) connected to the first base station 310, the second base station 320, a UE (not-depicted) connected to the second base station 320, the third base station 330, and a UE (not-depicted) connected to the third base station 330 may transmit and receive signals through a CA using the licensed band F1 and the unlicensed band F3.

Figure 4:
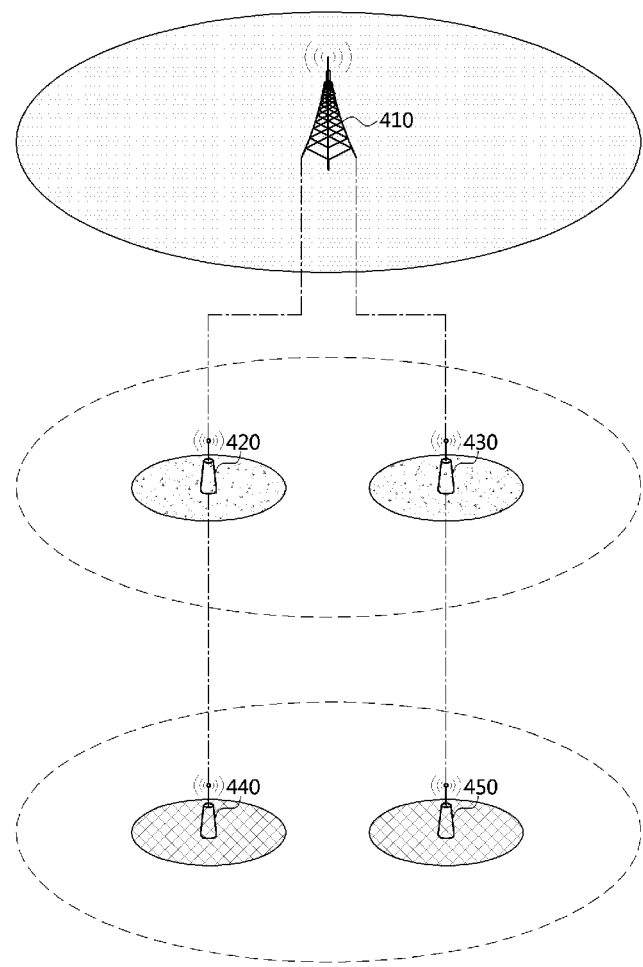
FIG. 4 is a conceptual diagram illustrating a fourth exemplary embodiment of a wireless communication network.

FIG. 4 is a conceptual diagram illustrating a fourth exemplary embodiment of a wireless communication network.

Referring to FIG. 4, each of a first base station 410, a second base station 420, and a third base station 430 may support cellular communications (e.g., LTE, LTE-A, LAA, etc.). Each of the first base station 410, the second base station 420, and the third base station 430 may support MIMO (e.g., SU-MIMO, MU-MIMO, massive MIMO, etc.), CoMP, CA, etc. The first base station 410 may operate in the licensed band F1, and form a macro cell. The first base station 410 may be connected to other base stations (e.g. the second base station 420, the third base station 430, etc.) through ideal backhaul links or non-ideal backhaul links. The second base station 420 may be located in coverage of the first base station 410. The second base station 420 may operate in the licensed band F2, and form a small cell. The third base station 430 may be located in coverage of the first base station 410. The third base station 430 may operate in the licensed band F2, and form a small cell. Each of the second base station 420 and the third base station 430 may operate in the licensed band F2 different from the licensed band F1 in which the first base station 410 operates.

The second base station 420 may be connected with a fourth base station 440 through an ideal backhaul link or a non-ideal backhaul link. The fourth base station 440 may be located in coverage of the second base station 420. The fourth base station 440 may operate in the unlicensed band F3, and form a small call. The third base station 430 may be connected with a fifth base station 450 through an ideal backhaul link or a non-ideal backhaul link. The fifth base station 450 may be located in coverage of the third base station 430. The fifth base station 450 may operate in the unlicensed band F3, and form a small cell. Each of the base stations 440 and 450 may support WLAN standardized in IEEE 802.11.

Each of the first base station 410 and a UE (not-depicted) connected to the first base station 410 may transmit and receive signals through a CA using the licensed band F1 and the unlicensed band F3. Each of the second base station 420, a UE (not-depicted) connected to the second base station 420, the third base station 430, and a UE (not-depicted) connected to the third base station 430 may transmit and receive signals through a CA using the licensed band F2 and the unlicensed band F3.

The above-described communication nodes constituting a wireless communication network (e.g., a base station, a UE, etc.) may transmit signals according to a Listen-Before-Talk (LBT) procedure in the unlicensed band. That is, the communication node may determine whether the unlicensed band is occupied or not by performing an energy detection operation. The communication node may transmit a signal when the unlicensed band is determined as idle state. In this case, the communication node may transmit a signal when the unlicensed band is maintained as idle state during a contention window according to a random backoff operation. On the contrary, when the unlicensed band is determined as a busy state, the communication node may not transmit a signal.

Alternatively, the communication entity may transmit a signal based on a Carrier Sensing Adaptive Transmission (CSAT) operation. That is, the communication node may transmit a signal based on a pre-configured duty cycle. The communication node may transmit a signal when a current duty cycle is a duty cycle assigned for communication nodes supporting cellular communications. On the contrary, the communication node may not transmit a signal when a current duty cycle is a duty cycle assigned for communication nodes supporting other communications (e.g., WALN, etc.) except cellular communications. The duty cycle may be determined adaptively based on the number of communication nodes existing and supporting WLAN in the unlicensed band, a usage state of the unlicensed band, etc.

The communication node may perform discontinuous transmission in the unlicensed band. For example, if a maximum transmission duration or a maximum channel occupancy time is configured for the unlicensed band, the communication node may transmit signals during the maximum transmission duration or the maxim channel occupancy time. In a case that the communication node cannot transmit whole signals during the current maximum transmission duration (or, maximum channel occupancy time), the communication node may transmit the rest of signals in a next maximum transmission duration. Also, the communication node may select a carrier having relatively smaller interferences among unlicensed bands, and operate in the selected carrier. Also, in the case that the communication node transmits signals in the unlicensed band, transmission power can be controlled in order to reduce interferences to other communication nodes.

On the other hand, the communication node may support communication protocols based on code division multiple access (CDMA), wideband CDMA (WCDMA), time division multiple access (TDMA), frequency division multiple access (FDMA), single carrier FDMA (SC-FDMA), orthogonal frequency division multiplexing (OFDM), or orthogonal frequency division multiple access (OFDMA).

A base station among communication nodes may be referred to as a Node-B (NB), an evolved Node-B (eNB), a base transceiver station (BTS), a radio base station, a radio transceiver, an access point (AP), or an access node. Also, a user equipment (UE) among communication nodes may be referred to as a terminal, an access terminal, a mobile terminal, a station, a subscriber station, a portable subscriber station, a mobile station, a node, or a device. The communication node may have a structure which will be described below.

Figure 5:
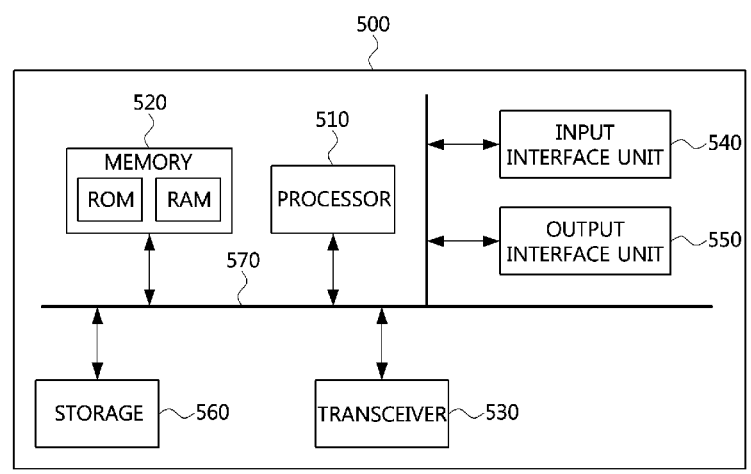
FIG. 5 is a block diagram illustrating an embodiment of a communication node constituting a wireless communication network.

FIG. 5 is a block diagram illustrating an embodiment of a communication node constituting a wireless communication network.

Referring to FIG. 5, a communication node 500 may include at least one processor 510, a memory 520 and a transceiver 530 connected to a network and performing communication. Further, the communication node 500 may include an input interface unit 540, an output interface unit 550, and a storage 560. The respective components included in the communication node 500 may be connected via a bus 570 to communicate with each other.

The processor 510 may perform a program command stored in the memory 520 and/or the storage 560. The processor 510 may be a central processing unit (CPU), a graphics processing unit (GPU) or a dedicated processor in which the methods according to embodiments of the present disclosure are performed. The memory 520 and the storage 560 may include a volatile storage medium and/or a non-volatile storage medium. For example, the memory 520 may include a read only memory (ROM) and/or a random access memory (RAM).

Operation methods of the communication node in the wireless communication network will be described below. Although a method (e.g., signal transmission or reception) performed by a first communication node will be described, a second communication node corresponding thereto may perform a method (e.g., signal reception or transmission) corresponding to the method performed by the first communication node. That is, when an operation of the UE is described, the base station corresponding thereto may perform an operation corresponding to the operation of the UE. On the contrary, when an operation of the base station is described, the UE may perform an operation corresponding to an operation of the base station.

Meanwhile, a carrier aggregation may be applied to at least one of unlicensed band cells and at least one of licensed band cells. Configuration, addition, modification, or release of the unlicensed band cell may be performed through a radio resource control (RRC) signaling (e.g., transmission and reception of 'RRCConnectionReconfiguration' messages (hereinafter, referred to as a 'RRC message')). The RRC message may be transmitted to a UE through the licensed band cell, and may include information required for management and operation of the unlicensed band cell.

Unlike the licensed band cell, the period in which a signal can be continuously transmitted in the unlicensed band cell may be limited within the maximum transmission duration. Further, when a signal is transmitted based on the LBT, the signal may be transmitted when transmission of another communication node is completed. In the case that LTE (or LTE-A) services are provided in the unlicensed band cell, transmission of communication nodes supporting the LTE (or LTE-A) may have aperiodic, discontinuous, opportunistic characteristics. Based on these characteristics, a signal transmitted continuously by a communication node supporting the LTE (or LTE-A) for a certain time period in the unlicensed band may be referred to as 'unlicensed band burst'.

Also, a contiguous set of subframes consisting of a combination of at least one of a channel defined in the licensed band (e.g., a physical control format indicator channel (PCFICH), a physical hybrid automatic repeat request (ARQ) indicator channel (PHICH), a physical downlink control channel (PDCCH), a physical multicast channel (PMCH), a physical uplink control channel (PUCCH), a physical uplink shared channel (PUSCH), etc.) and a signal (e.g., a synchronization signal, a reference signal, etc.) may be transmitted over the unlicensed band. In this case, transmission of the subframes may be referred to as 'unlicensed band transmission'.

Frames used for the transmission in the unlicensed band may be classified into a downlink (DL) unlicensed band burst frame, an uplink (UL) unlicensed band burst frame, and a UL/DL unlicensed band burst frame. The DL unlicensed band burst frame may include a subframe to which the unlicensed band transmission is applied, and may further include an 'unlicensed band signal'. In the DL unlicensed band burst frame, the unlicensed band signal may be located before the subframe to which the unlicensed band transmission is applied. The unlicensed band signal may be configured to match a timing of a subframe (or a timing of an OFDM symbol) to which the unlicensed band transmission is applied to a timing of a subframe (or a timing of an OFDM symbol) in the licensed band. Also, the unlicensed band signal may be used for automatic gain control (AGC), synchronization acquisition, channel estimation, etc. required for reception of data based on the unlicensed band transmission.

The subframe to which the unlicensed band transmission is applied may be configured within the maximum transmission duration (or the maximum channel occupancy time). That is, the number of subframes to which the unlicensed band transmission is applied may be determined based on the maximum transmission duration (or the maximum channel occupation time). Here, the number of subframes to which the unlicensed band transmission is applied may be determined in consideration of the unlicensed band signal. In the unlicensed, the maximum transmission duration (or the maximum channel occupancy time) may be notified via RRC signaling. The UE may identify a start point of the unlicensed band burst by detecting the PDCCH (or EPDCCH) or the unlicensed band signal. An actual occupancy time by the subframe to which the unlicensed band burst or the unlicensed band transmission is applied may be known via the unlicensed band signal or PHICH.

The unlicensed band signal may include information (or sequence) indicating the number (or time) of the subframes used for the unlicensed band burst or the unlicensed band transmission. Alternatively, information (or sequence) indicating the number (or time) of the subframes used for the unlicensed band burst or the unlicensed band transmission may be transmitted via the PHICH.

In the unlicensed band, transmission of HARQ-related information for UL may be performed asynchronously differently from the licensed band. Thus, the RV and HARQ process number may be transmitted on the PDCCH (or EPDCCH) instead of the PHICH. In this case, the PHICH may be used for transmission of other information. For example, information (or sequence) indicating the number (or time) of the subframes used for the unlicensed band burst or the unlicensed band transmission may be transmitted via the PHICH.

Meanwhile, the cellular communication network (e.g. LTE network) may support frequency division duplexing (FDD) or time division duplexing (TDD). A frame based on FDD may be defined as a type 1 frame, and a frame based on TDD may be defined as a type 2 frame.

Figure 6:
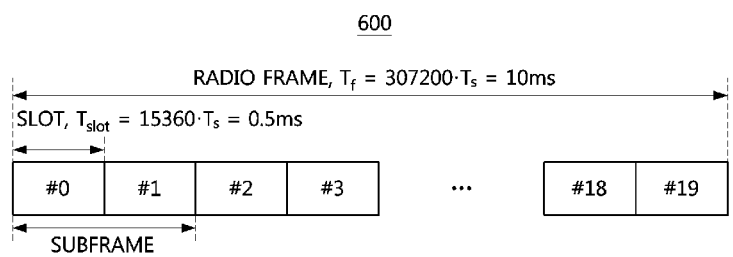
FIG. 6 is a conceptual diagram illustrating an exemplary embodiment of a type 1 frame.

FIG. 6 is a conceptual diagram illustrating an exemplary embodiment of a type 1 frame.

Referring to FIG. 6, a radio frame 600 may comprise 10 subframes, and each subframe may comprise two slots. Thus, the radio frame 600 may comprise 20 slots (e.g. slot #0, slot #1, slot #2, slot #3, . . . , slot #18, and slot #19). The length ($T_f$) of the radio frame 600 may be 10 milliseconds (ms). Also, the length of each subframe may be 1 ms. Also, the length ($T_{slot}$) of each slot may be 0.5 ms. Here, Ts may be 1/30,720,000 second.

Each slot may comprise a plurality of OFDM symbols in time domain, and comprise a plurality of resource blocks (RBs) in frequency domain. Each resource block may comprise a plurality of subcarriers in frequency domain. The number of OFDM symbols constituting each slot may be determined according to configuration of a cyclic prefix (CP). The CP may be classified into a normal CP and an extended CP. If the normal CP is used, each slot may comprise 7 OFDM symbols, and each subframe may comprise 14 OFDM symbols. If the extended CP is used, each slot may comprise 6 OFDM symbols, and each subframe may comprise 12 OFDM symbols.

For example, in the case that each subframe is composed of 14 OFDM symbols, the OFDM symbols constituting each subframe may be sequentially referred to as an OFDM symbol #0, an OFDM symbol #1, an OFDM symbol #2, an OFDM symbol #3, an OFDM symbol #4, an OFDM symbol #5, an OFDM symbol #6, an OFDM symbol #7, an OFDM symbol #8, an OFDM symbol #9, an OFDM symbol #10, an OFDM symbol #11, an OFDM symbol #12, and an OFDM symbol #13.

Figure 7:
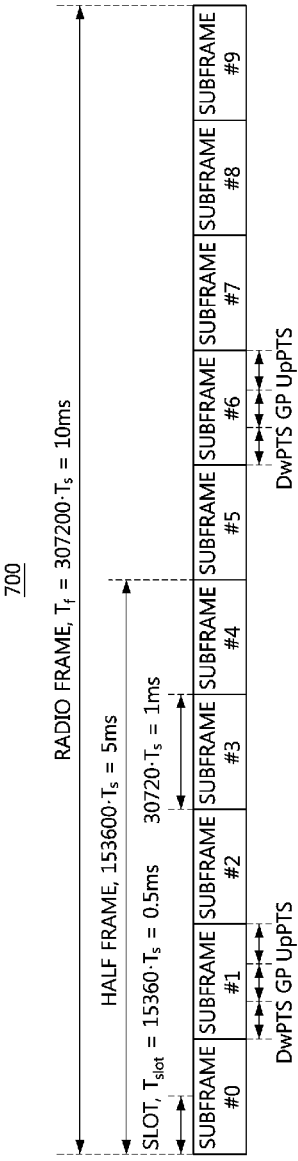
FIG. 7 is a conceptual diagram illustrating an exemplary embodiment of a type 2 frame.

FIG. 7 is a conceptual diagram illustrating an exemplary embodiment of a type 2 frame.

Referring to FIG. 7, a radio frame 700 may comprise two half frames, and each half frame may comprise 5 subframes. Thus, the radio frame 700 may comprise 10 subframes. The length ($T_f$) of the radio frame 700 may be 10 ms, and the length of each half frame may be 5 ms. The length of each subframe may be 1 ms. Here, $T_s$ may be 1/30,720,000 second.

The radio frame 700 may include at least one downlink subframe, at least one uplink subframe, and at least one special subframe. Each of the downlink subframe and the uplink subframe may comprise two slots. The length (Tslot) of each slot may be 0.5 ms. Each of subframe#1 and subframe#6, among subframes constituting the radio frame 700, may be a special subframe. Each special subframe may include a downlink pilot time slot (DwPTS), a guard period (GP), and an uplink pilot time slot (UpPTS).

The DwPTS may be regarded as included in downlink duration, and used for cell search, and time and frequency synchronization acquisition of a UE. The GP may be used for resolving interference to uplink data transmission which may occur due to delay of downlink data reception. Also, the GP may include a time required for switching between downlink data reception operation to uplink data transmission operation. The UpPTS may be used for uplink channel estimation, and time and frequency synchronization acquisition of a UE, etc.

The lengths of the DwPTS, GP, and UpPTS may be controlled variably as needed. Also, the numbers and positions of the downlink subframes, uplink subframes, and special subframes, included in the radio frame 700, may vary as needed.

Figure 8:
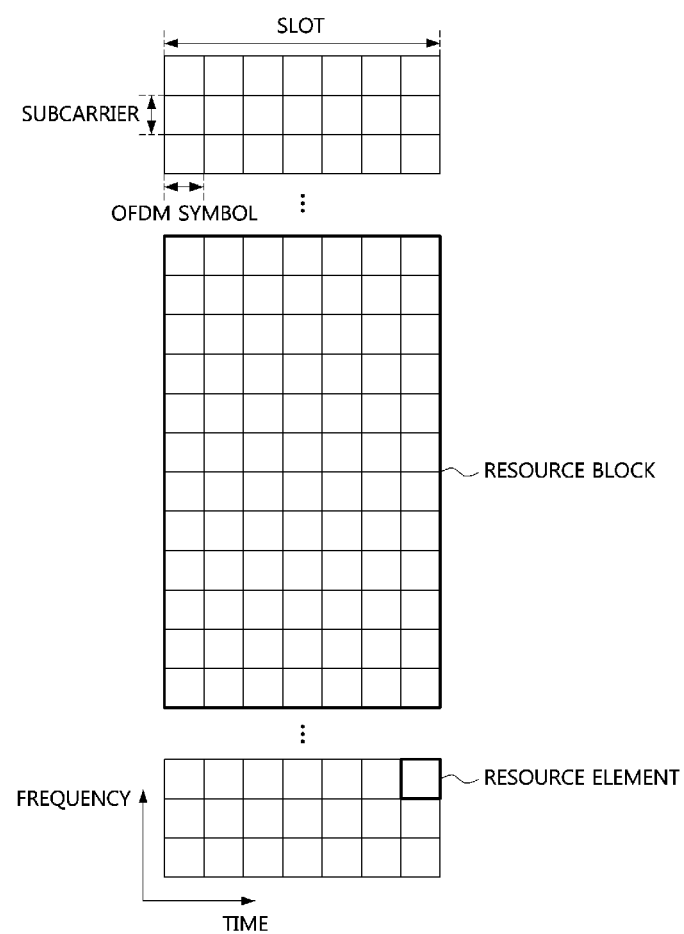
FIG. 8 is a conceptual diagram illustrating an exemplary embodiment of a resource grid of a slot included in a subframe.

FIG. 8 is a conceptual diagram illustrating an exemplary embodiment of a resource grid of a slot included in a subframe.

Referring to FIG. 8, when the normal CP is used, each resource block (RB) of a slot included in a downlink subframe or an uplink subframe may comprise 7 OFDM symbols in time domain, and 12 subcarriers in frequency domain. In this case, a resource defined by a single OFDM symbol in time domain and a single subcarrier in frequency domain may be referred to as a resource element (RE).

In downlink transmission of a cellular communication network (e.g. LTE network), allocation of resources for a UE may be performed in unit of RBs, and mapping of reference signals and synchronization signals may be performed in unit of REs.

A control channel may be allocated to three OFDM symbols (e.g., OFDM symbols #0 to #2) or four OFDM symbols (e.g., OFDM symbols #0 to #3) located in the front part in the first slot of the subframe. The control channel may include PDCCH, PCFICH, PHICH, and the like. A data channel (e.g., PDSCH) used for data transmission may be allocated to the remaining area (e.g., OFDM symbols #4 to #13) other than the area where the control channel is configured in the subframe. Also, the EPDCCH may be configured in some RB (or RE) among the remaining area.

Information indicating the number of OFDM symbols used for the control channel may be transmitted via the PCFICH. The PCFICH may be configured in the OFDM symbol #0 of the subframe. A response (e.g., a HARQ response, etc.) to the uplink transmission (e.g., the PUSCH, etc.) may be transmitted via the PHICH. Here, the HARQ response may include an acknowledgment (ACK), a negative ACK (NACK), discontinuous transmission (DTX), ANY, and the like.

Downlink control information (DCI) may be transmitted through at least one of PDCCH and EPDCCH. Also, the DCI may include at least one of resource allocation information and resource control information for a UE or a specific group of UEs. For example, the DCI may include downlink scheduling information, uplink scheduling information, uplink transmit power control command, etc. Here, the specific group of UEs may include at least one UE.

The DCI may have a various format according to type, number, and size (e.g. the number of bits constituting information fields) of information fields. The DCI format 0, 3, 3A, 4, etc. may be used for uplink, and the DCI format 1, 1A, 1B, 1C, 1D, 2, 2A, 2B, 2C, etc. may be used for downlink. Information included in the DCI may vary according to the format of the DCI. For example, at least one of a carrier indicator field (CIF), resource block allocation information, modulation and coding scheme (MCS) information, redundancy version (RV) information, new data indicator (NDI) information, transmit power control (TPC) information, HARQ process number information, precoding matrix indicator (PMI) information (or, PMI confirmation information), hopping flag information, flag field information, etc. may be selectively included in the DCI according to the format of the DCI. Thus, the size of control information may vary according to the format of DCI. Also, the same DCI format may be used for transmitting two or more types of control information. In this case, control information may be classified according to the flag field included in the DCI. Control information included in the DCI, according to respective DCI formats, may be explained as the following table 1.

TABLE 1

| DCI Format | Information |
|---|---|
| Format 0 | Resource grants for the PUSCH transmissions (uplink) |
| Format 1 | Resource assignments for single codeword PDSCH transmissions (transmission modes 1, 2 and 7 |

TABLE 1-continued

| DCI Format | Information |
|---|---|
| Format 1A | Compact signaling of resource assignments for single codeword PDSCH (all modes) |
| Format 1B | Compact resource assignments for PDSCH using rank-1 closed loop preceding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustments |

The PDCCH may be allocated to a set of one or more contiguous control channel elements (CCEs), and the EPDCCH may be allocated to a set of one or more contiguous enhanced CCEs (ECCEs). The CCE or ECCE may be a logical allocation unit, and comprise a plurality of resource element groups (REGs). The size of bits transmitted through the PDCCH (or, EPDCCH) may be determined according to the number of CCEs or ECCEs, coding rate, etc.

Figure 9:
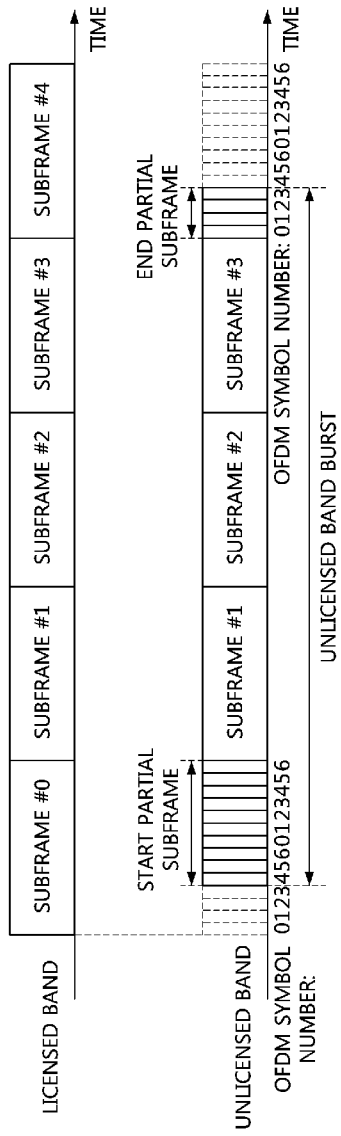
FIG. 9 is a timing diagram illustrating an exemplary embodiment of an unlicensed band burst.

FIG. 9 is a timing diagram illustrating an exemplary embodiment of an unlicensed band burst.

Referring to FIG. 9, a timing of a subframe (or, slot or OFDM symbol) in the licensed band may be identical to a timing of a subframe (or, slot or OFDM symbol) in the unlicensed band. Here, the licensed band may be referred to as a 'licensed band cell' or a 'primary cell (PCell)'. The unlicensed band may be referred to as an 'unlicensed band cell', a 'secondary cell (SCell)', or a 'LAA cell'. In the licensed band, signals can be transmitted continuously. That is, burst transmissions in the licensed band may occur continuously.

On the contrary, burst transmissions in the unlicensed band may occur discontinuously. For example, an unlicensed band burst may occur in unit of 4 subframes. A start subframe among subframes constituting the unlicensed band burst may have the size of less than 1 millisecond (ms). The start subframe having the size of less than 1 ms may be referred to as a 'start partial subframe'. Also, an end subframe among subframes constituting the unlicensed band burst may have the size of less than 1 ms. The end subframe having the size of less than 1 ms may be referred to as an 'end partial subframe'. The sum of the lengths of the start partial subframe and the end partial subframe may be configured to be 1 ms. For example, the start partial subframe may comprise an OFDM symbol#4 of a first slot to an OFDM symbol#6 of a second slot. In this case, the end partial subframe may comprise OFDM symbols #0 to #3 of a first slot.

The start point of the unlicensed band burst (or, the start partial subframe) may be configured within a predetermined set of OFDM symbols. For example, the start point of the unlicensed band burst may be configured as the OFDM symbol#0 of the first slot or the OFDM symbol#0 of the second slot. Alternatively, the start point of the unlicensed band burst in the TDD-based network may be configured to be an OFDM symbol located after a predetermined offset from the OFDM symbol#0 of the first slot. Here, the predetermined offset may be a value corresponding to a time duration of 'GP+UpPTS'. For example, the start point of the unlicensed band burst in the TDD-based network may be the OFDM symbol #0, #2, #3, or #5 of the first slot, or the OFDM symbol #1 of the second slot in the subframe.

Alternatively, the start point of the unlicensed band burst may be configured to be a start point or an end point of the PDCCH, or a transmission point of a reference signal (e.g. cell-specific reference signal (CRS), etc.). For example, the start point of the unlicensed band burst may be the OFDM symbol #0 or #4 of the first slot of the subframe. However, the start point of the unlicensed band burst may not be restricted to the above-described examples, and may be configured to be any OFDM symbol of the subframe.

Meanwhile, a cyclic redundancy check (CRC) for error detection may be attached to the control information transmitted through the PDCCH (or EPDCCH) based on the DCI format. The CRC may be masked (e.g., scrambled) based on a radio network temporary identifier (RNTI) of a communication node (e.g., UE, station, etc.) which will receive the PDCCH (or EPDCCH). Alternatively, the CRC may be masked (e.g., scrambled) based on specific RNTIs configured for various purposes. The types of RNTIs and corresponding values are shown in Table 2 below.

TABLE 2

| Value (hexadecimal) | RNTI |
|---|---|
| 0000 | N/A |
| 0001~003C | RA-RNTI, C-RNTI, Semi Persistent Scheduling (SPS) C-RNTI, temporary C-RNTI, enhanced interference management and traffic adaptation (eIMTA)-RNTI, TPC-PUCCH-RNTI, TPC-PUSCH-RNTI, sidelink (SL)-RNTI |
| 003D~FFF3 | C-RNTI, SPS C-RNTI, temporary C-RNTI, eIMTA-RNTI, TPC-PUCCH-RNTI, TPC-PUSCH-RNTI, SL-RNTI |
| FFF4~FFFC | reserved |
| FFFD | M-RNTI |
| FFFE | P-RNTI |
| FFFF | SI-RNTI |

Each RNTI may have its specific purpose as shown in Table 3.

TABLE 3

| RNTI | Purpose |
|---|---|
| P-RNTI | Paging and notification of change in system information |
| SI-RNTI | Broadcasting of system information |
| M-RNTI | Notification of change in multicast control channel (MCCH) information |
| RA-RNTI | Random access response |
| eIMTA-RNTI | Notification of eIMTA TDD UL/DC configuration |
| Temporary C-RNTI | Contention resolution (in case that a valid C-RNTI is not available) |
| Temporary C-RNTI | Msg3 transmission |
| C-RNTI | Unicast transmission scheduled dynamically (uplink or downlink) |
| C-RNTI | Triggering of PDCCH ordered by random access |
| SPS C-RNTI | Unicast transmission according to SPS (activation, reactivation, retransmission) |
| SPS C-RNTI | Unicast transmission according to SPS (deactivation) |
| TPC-PUCCH-RNTI | Power control of physical layer uplink |
| TPC-PUSCH-RNTI | Power control of physical layer uplink |
| SL-RNTI | Sidelink transmission scheduled dynamically |

An unlicensed band cell related identifier may be referred to as an unlicensed band cell RNTI (U-RNTI) and may be referred to differently depending on information of the unlicensed band cell. The U-RNTI may be transmitted to the UE via RRC signaling.

The PDCCH (or EPDCCH) containing the CRC masked (e.g., scrambled) with the U-RNTI may be transmitted via a common search space or a UE-specific search space. The position of the PDCCH (or EPDCCH) in the common search space or the UE-specific search space may be determined by an aggregation level of the CCE (or ECCE), a CCE (or ECCE) index calculated based on the U-RNTI, or the like. The position ($S_k^{(L)}$) of a candidate CCE (or ECCE) to be monitored in the common search space or the UE-specific search space may be determined based on Equation 1 below. The UE may monitor the candidate CCE (or ECCE) to obtain the PDCCH (or EPDCCH).

$$S_k^{(L)}=L\{(Y+m')\bmod \lfloor N_{CCE,k}/L \rfloor\}$$ [Equation 1]

L may indicate the aggregation level. For example, L may be 1, 2, 4, or 8. The aggregation level of the CCE (or ECCE) included in the PDCCH (or EPDCCH) transmitted in a partial sub-frame (i.e., a subframe having a length of less than 1 ms) of the unlicensed band may be greater than 8 (e.g., 16, 32, etc.). In the common search space, $Y_k$ may be set to zero. Furthermore, $Y_k$ may be determined based on an RNTI (e.g., U-RNTI in the unlicensed band). m' may be a positive integer less than the total number (M(L)−1) of the candidate PDCCH (or, candidate EPDCCH, candidate CCE, candidate ECCE) to be monitored in the common search space (or UE-specific search space). $N_{CCE,\ k}$ may indicate the total number of CCEs (or ECCEs) contained in subframe k.

Meanwhile, the U-RNTI may be configured as a UE-specific value, a common value for a base station, a common value for an unlicensed band cell, a preliminary value, or the like. A U-RNTI having a UE-specific value may be referred to as a 'UE-specific U-RNTI'. A U-RNTI having a common value for a base station may be referred to as 'base station common U-RNTI'. A U-RNTI having a common value for an unlicensed band cell may be referred to as an 'unlicensed band cell common U-RNTI'.

The UE-specific U-RNTI may be transmitted via RRC signaling with information related to configuration, addition, etc. of the unlicensed band cell. The base station common U-RNTI may be used for transmission of configuration, system information, and the like of the unlicensed band cell which are configured by the base station. The base station common U-RNTI may be preset equal to or similar to the SI-RNTI, or may be obtained via RRC signaling. The unlicensed band cell common U-RNTI may have different values for each unlicensed band cell and may be obtained through RRC signaling. For example, in a procedure in which an unlicensed band cell is newly configured as a SCell, an unlicensed band cell common U-RNTI may be included in an RRC message (e.g., an RRCConnectionReconfiguration message).

The U-RNTI may be used for transmission of unlicensed band related information (e.g., configuration/addition/modification/release of the unlicensed band cell, system information, etc.) supported by the base station. Also, the U-RNTI may be used to transmit control information of different unlicensed band cells. The U-RNTI may also be used for transmission of a dynamic activation or deactivation request message of an unlicensed band cell. Here, the U-RNTI may be configured differently according to its purpose of use or a PDCCH (or EPDCCH) reception target. For example, a U-RNTI that is used for transmission of an activation or deactivation message of a common unlicensed band cell may be configured, or a U-RNTI that is used for transmission of an activation or deactivation message of a UE-specific unlicensed band cell.

Also, the U-RNTI may be used to schedule an UL resource used for transmission of specific information of an unlicensed band cell. In this case, the UE may acquire such the additional information by detecting scheduling information of the UL resource and the U-RNTI. For example, the UE may receive a PDCCH (or EPDCCH) containing a CRC masked (e.g., scrambled) with a U-RNTI in a subframe of the licensed band. When a collision occurs between signals in a subframe of an unlicensed band corresponding to the subframe of the licensed band through which the PDCCH (or EPDCCH) is transmitted, the UE may transmit information indicating that the collision is recognized (hereinafter, referred to as 'collision-aware information') to the base station. Here, the collision-aware information may be transmitted through the UL resource indicated by the scheduling information included in the PDCCH (or EPDCCH).

Then, a method of activating and deactivating a licensed band cell will be described.

Activation and deactivation of a secondary cell in the licensed band may be performed based on an activation/deactivation MAC control element (CE). An index of the secondary cell in the licensed band, which is set to '0' in the activation/deactivation MAC CE, may indicate that the secondary cell in the licensed band operates in an inactive state. On the other hand, an index of the secondary cell in the licensed band, which is set to '1' in the activation/deactivation MAC CE, may indicate that the secondary cell in the licensed band operates in an active state.

Also, activation and deactivation of the secondary cell in the licensed band may be performed based on a time indicated by a SCell deactivation time field included in an RRC message. The SCell deactivation time field may indicate 20 ms, 40 ms, 80 ms, 160 ms, 320 ms, 640 ms, 1280 ms, or the like. For example, if the time indicated by the SCell deactivation time field has elapsed, the state of the secondary cell in the licensed band may be switched from the active state to the inactive state. A case that the SCell deactivation time field is not set may mean that the SCell deactivation time field indicates an indefinite time. The time indicated by the SCell deactivation time field may be applied to all secondary cells in the licensed band.

For example, if an activation/deactivation MAC CE indicating activation of the secondary cell is received in a subframe #n of the licensed band, the UE may activate the secondary cell in the licensed band, and activate (or, reactivate) a timer based on the time indicated by the SCell deactivation time field from a subframe #(n+8). Then, when the UE receives a PDCCH (or EPDCCH) for UL or DL scheduling (e.g., self-carrier scheduling or cross-carrier scheduling) for the activated secondary cell in the licensed band, the timer may be reactivated based on the time indicated by the SCell deactivation time field. If an activation/deactivation MAC CE indicating deactivation of the secondary cell in the licensed band is received or the time indicated by the SCell deactivation time field has elapsed, the UE may deactivate the secondary cell in the licensed band. In this case, the UE may deactivate the secondary cell in the licensed band even before the subframe #(n+8).

Meanwhile, activation and deactivation of an unlicensed cell may also be performed based on the activation/deactivation MAC CE and SCell deactivation time field. When the unlicensed band is occupied by another communication node, the UE may not receive a PDCCH (or EPDCCH) until the time indicated by the SCell deactivation time field elapses (e.g., until the state of the unlicensed band cell is switched from the active state to the inactive state). In this case, reactivation of the unlicensed band cell may be required. In order to solve this problem, activation and deactivation of the unlicensed band cell may be performed as follows.

Activation/Deactivation Based on Minimum Deactivation Time

A 'minimum deactivation time' may be set separately from the time indicated by the SCell deactivation time field included in the RRC message. The minimum deactivation time may be preset by the base station and the UE. Alternatively, the minimum deactivation time may be transmitted to the UE via an RRC message. The UE may obtain the SCell deactivation time field and the minimum deactivation time, and compare the time indicated by the SCell deactivation time field with the minimum deactivation time. In a case that the time indicated by the SCell deactivation time field is greater than the minimum deactivation time, the UE may activate a timer for the time indicated by the SCell deactivation time field and deactivate the unlicensed band cell if the timer expires. On the other hand, in a case that the time indicated by the SCell deactivation time field is less than the minimum deactivation time, the UE may activate a timer for the minimum deactivation time, and deactivate the unlicensed band cell if the timer expires. Here, the minimum deactivation time may indicate an indefinite time. In this case, the UE may activate the timer for the minimum deactivation time regardless of the SCell deactivation time field.

Activation/Deactivation Based on Time Indicated by SCell Deactivation Time Field The UE may calculate a changed time by multiplying the time indicated by the SCell deactivation time field by a predetermined integer. The UE may activate a timer for the changed time and may deactivate the unlicensed band cell if the timer expires. Here, the predetermined integer may be predetermined in the base station and the UE. Alternatively, the predetermined integer may be transmitted to the UE via an RRC message.

Activation/Deactivation Based on Time Indicated by Unlicensed Band SCell Deactivation Time Field Defined for Unlicensed Band Cell The UE may obtain an unlicensed band SCell deactivation time field via RRC signaling in the licensed band or the unlicensed band. The unlicensed band SCell deactivation time field may be used for a communication node operating in the unlicensed band. The UE may activate a timer for the time indicated by the unlicensed band SCell deactivation time field, and deactivate the unlicensed band cell if the timer expires.

Activation/Deactivation Based on SCell Deactivation Time Field Indicating Indefinite Time In the case that the SCell deactivation time field indicates an indefinite time, the UE may activate or deactivate the unlicensed band cell based on the activation/deactivation MAC CE.

On the other hand, activation and deactivation of the unlicensed band cell may be performed based on a PDCCH (or EPDCCH) instead of the MAC CE, unlike the activation and deactivation of the licensed band cell. A method of activating or deactivating the unlicensed band cell based on a PDCCH (or EPDCCH) will be described as follows.

Figure 10:
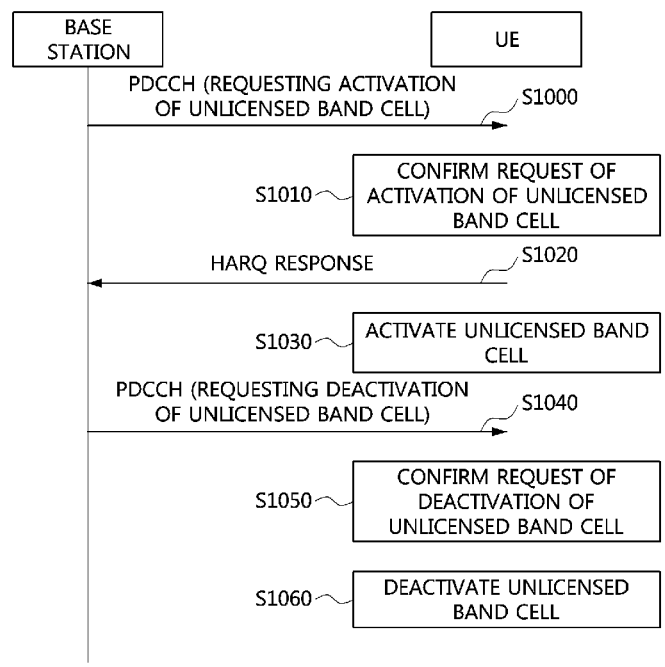
FIG. 10 is a sequence chart illustrating a first exemplary embodiment of a method of activating or deactivating an unlicensed band cell.

FIG. 10 is a sequence chart illustrating a first exemplary embodiment of a method of activating or deactivating an unlicensed band cell.

Referring to FIG. 10, a base station and a UE may form the wireless communication network described with reference to FIGS. 1 to 4, and may support the licensed band and the unlicensed band. The base station may support carrier aggregation. The base station and the UE may be configured to be the same as or similar to the communication node 500 described with reference to FIG. 5. The timing of the subframe (or slot, OFDM symbol, etc.) of the licensed band may be the same as the timing of the subframe (or slot, OFDM symbol, etc.) of the unlicensed band.

The base station may transmit a PDCCH (or EPDCCH) including information requesting activation of the unlicensed band cell to the UE through a subframe #n of the licensed band or another activated unlicensed band (S1000). In order to request the activation of the unlicensed band cell, a PDCCH (or EPDCCH) including a CRC masked (e.g., scrambled) with a C-RNTI, or a PDDCH (or EPDCCH) including a CRC masked (e.g., scrambled) with an activation U-RNTI may be used. The activation U-RNTI may be used for requesting activation of the unlicensed band cell.

When the PDCCH (or EPDCCH) including the CRC masked (e.g., scrambled) based on a C-RNTI is used, a DCI included in the PDCCH (or EPDCCH) may include information (e.g., CIF) indicating a deactivated unlicensed band cell. Alternatively, the DCI included in the PDCCH (or EPDCCH) may further include a newly defined activation/deactivation field. The size of the activation/deactivation field may be 1 bit. The activation/deactivation field set to '0' may indicate activation of the unlicensed band cell, and the activation/deactivation field set to '1' may indicate deactivation of the unlicensed band cell. Conversely, the activation/deactivation field set to '0' may indicate deactivation of the unlicensed band cell, and the activation/deactivation field set to '1' may indicate activation of the unlicensed band cell.

The UE may receive the PDCCH (or EPDCCH) including information requesting activation of the unlicensed band cell through the subframe #n of the licensed band or another activated unlicensed band from the base station. If the PDCCH (or EPDCCH) containing a CRC masked (e.g., scrambled) based on a C-RNTI is used, the UE may identify the CIF or activation/deactivation field included in a DCI of the PDCCH (or EPDCCH), and determine that the activation has been requested (S1010). Alternatively, if the PDCCH (or EPDCCH) containing a CRC masked (e.g., scrambled) based on an activation U-RNTI is used, the UE may determine that the activation of the unlicensed band cell has been requested by identifying that the CRC contained in the PDCCH (or EPDCCH) is masked (e.g., scrambled) based on the activation U-RNTI (S1010).

Also, the UE may determine that the unlicensed band cell is activated from a sub-frame #(n+$N_{act}$). $N_{act}$ may be an integer of 1 or more. For example, $N_{act}$ may be 2, 4, 8, or the like. $N_{act}$ may be predetermined in the base station and UE. Alternatively, $N_{act}$ may be transmitted to the UE via RRC signaling. If the DCI contains a newly defined field for transmission of $N_{act}$, $N_{act}$ may be transmitted via the DCI. If $N_{act}$ is determined based on reception/demodulation capability of the UE, the $N_{act}$ may be transmitted to the UE through a reporting procedure for capability information of the UE.

Meanwhile, since the unlicensed band cell is activated from the subframe #(n+$N_{act}$), the UE may not receive a PDSCH of the subframe #n scheduled by the PDCCH (or EPDCCH) of the subframe #n. Therefore, the UE may transmit a HARQ response (e.g., NACK, DTX) indicating the non-reception of the PDSCH of the subframe #n to the base station through a UL resource of a subframe #(n+4) (S1020). Here, the HARQ response may indicate that the UE has confirmed the request if activating the unlicensed band cell. Accordingly, when the base station receives the HARQ response from the UE, the base station may determine that the UE has confirmed the request for activating the unlicensed band cell.

On the other hand, if the HARQ response is not received from the UE, the base station may determine that the UE has not confirmed the request for activating the unlicensed band cell. Since the activation procedure of the unlicensed band cell is not normally performed, the base station may request again activation of the unlicensed band cell to the UE by using the above-described activation procedure of the unlicensed band cell (e.g., the activation procedure based on the activation/deactivation MAC CE).

Meanwhile, in the subframes #n to #(n+($N_{act}$−1)) of the unlicensed band cell, the base station may perform scheduling for UL resources or DL resources of the unlicensed band cell according to a predefined operation policy.

Here, the step S1020 may be performed when the CRC included in the PDCCH (or EPDCCH) received at the UE is masked (or, scrambled) based on the C-RNTI. That is, if the CRC included in the PDCCH (or EPDCCH) received at the UE is masked (e.g., scrambled) based on the activation U-RNTI, the step S1020 may not be performed.

The UE may activate the unlicensed band cell from the sub-frame #(n+$N_{act}$) (S1030). Accordingly, the UE may receive a PDCCH (or EPDCCH) from the subframe #(n+$N_{act}$) of the unlicensed band cell, receive a PDSCH through a DL resource indicated by scheduling information included in the PDCCH (or EPDCCH), and transmit a PUSCH through a UL resource indicated by the scheduling information included in the PDCCH (or EPDCCH).

Meanwhile, if the CRC included in the PDCCH (or EPDCCH) received by the UE in the step S1000 is masked (e.g., scrambled) based on the activation U-RNTI, the UE may receive a PDSCH in the subframe #(N+$N_{act}$) of the unlicensed band cell indicated by the scheduling information included in the PDCCH (or EPDCCH) of the subframe #(n+$N_{act}$). In this case, the UE may transmit a HARQ response (e.g., ACK) indicating reception of the PDSCH included in the subframe #(n+$N_{act}$t) to the base station through a subframe #(n+$N_{act}$+4) of the unlicensed band. Here, the HARQ response may indicate that the unlicensed band cell is activated. Accordingly, when the base station receives the HARQ response from the UE, the base station may determine that the unlicensed band cell is activated. On the other hand, if the base station fails to receive the HARQ response from the UE, the base station may determine that the unlicensed band cell is not activated. Since the activation procedure of the unlicensed band cell is not normally performed, the base station may request again activation of the unlicensed band cell to the UE by using the above-described activation procedure of the unlicensed band cell (e.g., the activation procedure based on the activation/deactivation MAC CE).

The above-described procedure of confirming activation of the unlicensed band cell based on the HARQ response may not be performed when the PDCCH (or EPDCCH) is transmitted through a common search space. In this case, the base station may perform scheduling for the UE using the C-RNTI from the subframe #(n+$N_{act}$) of the unlicensed band cell, and receive the HARQ response for the PDSCH transmitted based on the scheduling from the UE. The base station may determine that the unlicensed band cell is activated when receiving the HARQ response from the UE. On the other hand, if the base station fails to receive the HARQ response from the UE, the base station may determine that the unlicensed band cell is not activated. Since the activation procedure of the unlicensed band cell is not normally performed, the base station may request again activation of the unlicensed band cell to the UE by using the above-described activation procedure of the unlicensed band cell (e.g., the activation procedure based on the activation/deactivation MAC CE).

Meanwhile, the base station may transmit the PDCCH (or EPDCCH) including the information requesting deactivation of the unlicensed band cell to the UE through the unlicensed band (or the licensed band) (S1040). The information requesting deactivation of the unlicensed band cell may be the activation/deactivation field described above. Alternatively, the information requesting deactivation of the unlicensed band cell may be information (for example, RB information set to all zeros) which does not indicate any specific meaning among the information included in the DCI.

The UE may receive the PDCCH (or EPDCCH) from the base station through the unlicensed band (or licensed band). The UE may confirm that the deactivation of the unlicensed band cell is requested by identifying the information (e.g., activation/deactivation field) requesting deactivation of the unlicensed band cell included in the PDCCH (or EPDCCH). The UE may deactivate the unlicensed band cell after $N_{Dact}$ subframes from the subframe through which the information requesting the deactivation of the unlicensed band cell is transmitted (S1060). $N_{Dact}$ may be an integer of 1 or more. For example, $N_{Dact}$ may be 2, 4, 8, or the like. $N_{Dact}$ may be predetermined in the base station and UE. Alternatively, $N_{Dact}$ may be transmitted to the UE via RRC signaling. If the DCI contains a newly defined field for the transmission of $N_{Dact}$, the $N_{Dact}$ may be transmitted via the DCI. If $N_{Dact}$ is set based on reception/demodulation capability of the UE, $N_{Dact}$ may be transmitted to the UE through a reporting procedure for capability information of the UE.

Then, methods of scheduling for the unlicensed band cell will be described.

In a case that the self-carrier scheduling scheme is used, the scheduling information for the PDSCH included in the subframe #n of the unlicensed band cell may be transmitted through the PDCCH (or EPDCCH) included in the subframe #n of the unlicensed band cell. When the cross-carrier scheduling scheme is used, the scheduling information for the PDSCH included in the subframe #n of the unlicensed band cell may be transmitted through the PDCCH (or EPDCCH) included in the subframe #n of the licensed band cell corresponding to the subframe #n of the unlicensed band cell.

The scheduling information (e.g., grant) for the PUSCH included in the subframe #(n+4) of the unlicensed band cell may be transmitted through the PDCCH (or EPDCCH) included in the subframe #n of the licensed band cell or the unlicensed band cell. The scheduling information for the PUSCH included in the subframe #(n+4) of the unlicensed band cell may be included in the DCI (e.g., DCI having format 0). In this case, the UE may transmit the PUSCH through a UL resource included in the subframe #(n+4) of the unlicensed band cell indicated by the scheduling information. However, if the subframe #(n+4) of the unlicensed band cell is occupied by another communication node, the UE may transmit the PUSCH as follows.

As a first method, the UE may abandon the transmission of the PUSCH in the subframe #(n+4) of the unlicensed band cell when the subframe #(n+4) of the unlicensed band cell is occupied by another communication node. In this case, the UE may monitor the licensed band cell or the unlicensed band cell to receive a PDCCH (or EPDCCH) containing a DCI (e.g., DCI with format 0) containing new scheduling information for the PUSCH. When the PDCCH (or EPD-CCH) containing the DCI (e.g., a DCI with format 0) containing the new scheduling information for the PUSCH is received, the UE may transmit the PUSCH through a UL resource of the unlicensed band cell indicated by the new scheduling information.

As a second method, the UE may check a channel status in the subframes #(n+4) to #(n+4+$N_{UL\_Window}$) of the unlicensed band cell, and if the channel status becomes idle, the UE may transmit the PUSCH through a UL resource of the unlicensed band cell. In this case, the UE may transmit the PUSCH based on the scheduling information received through the sub-frame #n of the licensed band cell or the unlicensed band cell. Here, $N_{UL\_Window}$ may be predetermined in the base station and the UE. Alternatively, $N_{UL\_Window}$ may be transmitted to the UE via an RRC message (e.g., a newly defined RRC message for unlicensed band cell). $N_{UL\_Window}$ may be set to be equal to or less than the maximum transmission duration or the maximum channel occupancy time. $N_{UL\_Window}$ may be an integer greater than or equal to zero. For example, in the case that $N_{UL\_Window}$ is 0, then the UE may abandon the transmission of the PUSCH in the subframe #(n+4) of the unlicensed band cell if the subframe #(n+4) of the unlicensed band cell is occupied by another communication node. In this case, the UE may monitor the licensed band cell or the unlicensed band cell to receive a PDCCH (or EPDCCH) including a DCI (e.g., DCI with format 0) containing new scheduling information for the PUSCH.

Meanwhile, the communication node may perform an LBT operation to use the unlicensed band. For example, the communication node may check the channel status of the unlicensed band through energy measurement (or signal detection), and use the unlicensed band when the channel status is idle. The LBT operation may include a clear channel assessment (CCA) operation and a random access operation. The CCA operation may be performed to identify the channel status of the unlicensed band. The CCA operation may basically be performed on a slot basis.

When the CCA operation is performed, the communication node may identify the channel status of the unlicensed band for a predetermined time (for example, a time corresponding to a predetermined number of slots). Here, the predetermined time may be a distributed coordination function (DCF) interframe space (DIFS) defined in the WLAN standard. The communication node may perform the random access operation when the channel status of the unlicensed band is determined to have been the idle state for the predetermined time.

When the random access operation is performed, the communication node may randomly select a backoff value in a contention window and check the channel status of the unlicensed band for a time corresponding to the backoff value. The communication node may use the unlicensed band when the channel status of the unlicensed band is idle for a predetermined time. Here, the size of the contention window may be a fixed value or may be variable. The size of the contention window may be changed based on a channel occupancy state (e.g., a time during which a signal having an intensity of a predetermined threshold value or more is detected, a ratio (or occupancy rate) of a signal having an intensity of a predetermined threshold value or more, a histogram of the same, etc.), the number of communication nodes using the same unlicensed band (or, the same channel in the unlicensed band), HARQ responses (ACK, NACK, DTX, ANY), collision-aware information, information detected by other communication nodes, and the like.

The size of the contention window may be changed in a semi-static or dynamic manner. In the case of the semi-static manner, at least one information of the channel occupancy state, the number of communication nodes using the same unlicensed band (or, the same channel in the unlicensed band), the HARQ responses (ACK, NACK, DTX, ANY), the collision-aware information, and the information detected by other communication nodes may be obtained for a predetermined time, and the size of the contention window may be changed at predetermined intervals by using statistical results based on the obtained information. In the case of the dynamic manner, at least one information of the channel occupancy state, the number of communication nodes using the same unlicensed band (or, the same channel in the unlicensed band), the HARQ responses (ACK, NACK, DTX, ANY), the collision-aware information, and the information detected by other communication nodes may be obtained for a predetermine time, and the size of the contention window may be directly changed based on the obtained information.

The method of changing the size of the contention window based on the channel occupancy state may be performed as follows. Also, the method of changing the size of the contention window based on the channel occupancy state may be performed in the semi-static or dynamic manner.

Figure 11:
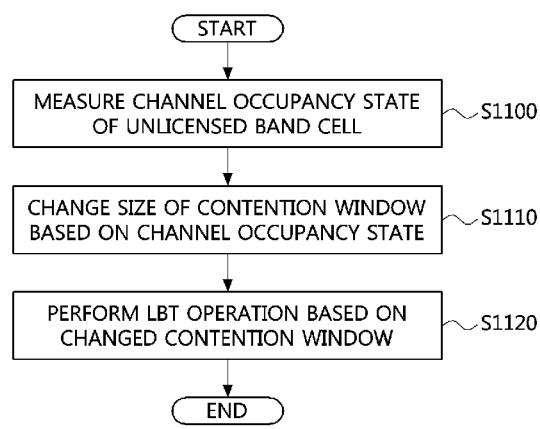
FIG. 11 is a flow chart illustrating a first exemplary embodiment of a method of changing a contention window size based on a channel occupancy state.

FIG. 11 is a flow chart illustrating a first exemplary embodiment of a method of changing a contention window size based on a channel occupancy state.

Referring to FIG. 11, a base station and a UE may form the wireless communication network described with reference to FIGS. 1 to 4, and may support the licensed band and the unlicensed band. The base station may support carrier aggregation. The base station and the UE may be configured to be the same as or similar to the communication node 500 described with reference to FIG. 5. The timing of the subframe (or slot, OFDM symbol, etc.) of the licensed band may be the same as the timing of the subframe (or slot, OFDM symbol, etc.) of the unlicensed band.

The base station may measure the channel occupancy state of the unlicensed band for a predetermined time (S1100). For example, the base station may compare intensity of a signal received through the unlicensed band for the predetermined time with a predetermined threshold value (e.g., a predetermined signal strength), and measure the channel occupancy state based on the comparison result. Here, the signal received through the unlicensed band for the predetermined time may not include signals scheduled by the base station. That is, the signal received via the unlicensed band for the predetermined time may be an interference signal generated by another communication node. The time scheduled by the base station may not be included in the predetermined time. Here, the measurement of the channel occupancy state may be performed every predetermined period.

For example, the base station may measure the channel occupancy state (e.g., channel occupancy rate) based on Equation 2 below.

[Equation 2]

$$\text{Channel Occupancy State} = \frac{\text{a time during which a signal having an intensity of a predetermined threshold value or more is detected}}{\text{predetermined time}} \times 100$$

The base station may change the size of the contention window based on the channel occupancy state (S1110).

Here, the size of the contention window may be changed every predetermined period. If the channel occupancy rate indicated by the channel occupancy state is equal to or greater than a predetermined occupancy threshold, the base station may increase the size of the contention window. On the other hand, if the channel occupancy rate indicated by the channel occupancy state is less than the predetermined occupancy threshold, the base station may maintain, reduce, or initialize the size of the contention window.

The base station may perform an LBT operation based on the size of the changed contention window (S1120). For example, the base station may select a backoff value in the changed contention window, and check the channel status for a time corresponding to the selected backoff value. If the channel status is an idle state, the base station may transmit signals in the unlicensed band. Further, the base station may transmit information indicating the size of the changed contention window to the UE via an RRC message or a DCI.

Figure 12:
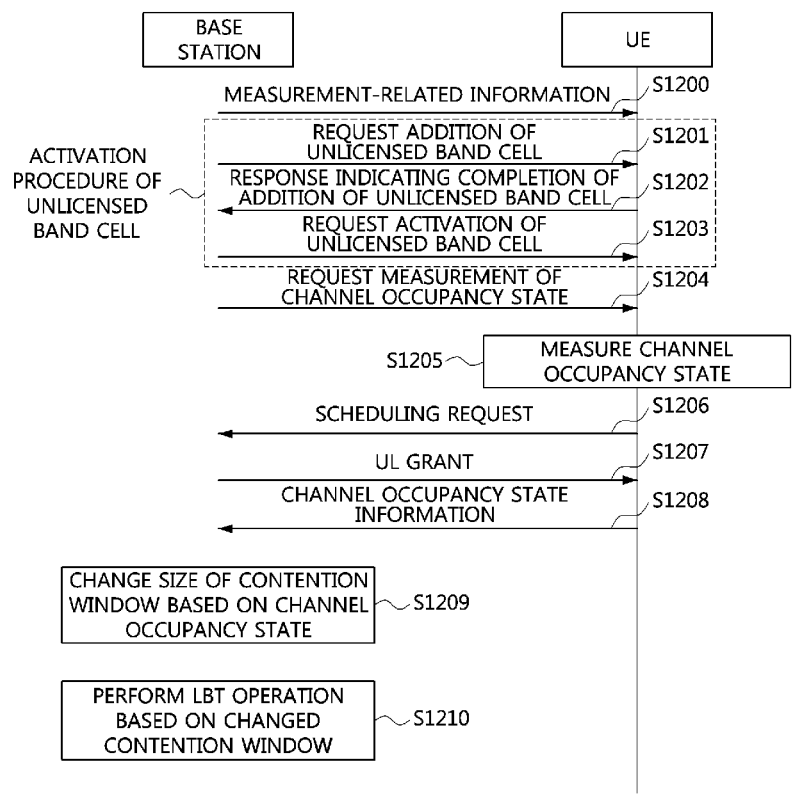
FIG. 12 is a sequence chart illustrating a second exemplary embodiment of a method of changing a contention window size based on a channel occupancy state.

FIG. 12 is a sequence chart illustrating a second exemplary embodiment of a method of changing a contention window size based on a channel occupancy state.

Referring to FIG. 12, a base station and a UE may form the wireless communication network described with reference to FIGS. 1 to 4, and may support the licensed band and the unlicensed band. The base station may support carrier aggregation. The base station and the UE may be configured to be the same as or similar to the communication node 500 described with reference to FIG. 5. The timing of the subframe (or slot, OFDM symbol, etc.) of the licensed band may be the same as the timing of the subframe (or slot, OFDM symbol, etc.) of the unlicensed band.

The base station may transmit measurement-related information to the UE (S1200). The measurement-related information may include an algorithm used for measuring the channel occupancy state, the predetermined threshold value (e.g., the predetermined signal strength), a measurement period, a measurement time, a reporting condition, and the like. The measurement-related information may be transmitted to the UE via an RRC message. The RRC message may be masked (e.g., scrambled) based on a C-RNTI or a U-RNTI. Alternatively, the measurement-related information may be configured in the base station and the UE. In this case, since the UE already knows the measurement-related information, the step S1200 may be omitted.

If the unlicensed band cell for which the measurement of the channel occupancy state is to be performed is in the active state, then the RRC message may be transmitted to the UE via the licensed band cell or the activated unlicensed band cell. On the other hand, if the unlicensed band cell for which the measurement of the channel occupancy state is to be performed is in the inactive state, the RRC message may be transmitted to the UE via the licensed band cell or another unlicensed band cell. Meanwhile, the UE may receive the RRC message from the base station and obtain the measurement-related information from the received RRC message.

If the unlicensed band cell for which the measurement of the channel occupancy state is to be performed is in the inactive state, the UE may measure the channel occupancy state in the unlicensed band cell in the inactive state. Alternatively, if the unlicensed band cell for which the measurement of the channel occupancy state is to be performed is in the inactive state, the UE may measure the channel occupancy state in the unlicensed band cell in the active state after the activation procedure of the unlicensed band cell is performed. The activation procedure of the unlicensed band cell may be as follows.

The base station may transmit an RRC message requesting addition of the unlicensed band cell to the UE (S1201). The RRC message requesting addition of the unlicensed band cell may be transmitted to the UE via the licensed band cell or another unlicensed band cell in the active state. The UE may receive the RRC message requesting addition of the unlicensed band cell from the base station and may add the unlicensed band cell in response to the addition request of the unlicensed band cell. If the unlicensed band cell is added, the UE may transmit a response (e.g., a response to the RRC message) indicating the completion of the addition of the unlicensed band cell to the base station (S1202). If the response indicating the completion of the addition of the unlicensed band cell is received from the UE, the base station may determine that the unlicensed band cell has been added. Then, the base station may transmit information (e.g., an activation/deactivation MAC CE included in a DCI) requesting activation of the added unlicensed band cell to the UE (S1203). If the information requesting activation of the added unlicensed band cell is received from the base station, the UE may activate the added unlicensed band cell.

When the added unlicensed band cell is activated, the base station may transmit a message requesting measurement of the channel occupancy state of the unlicensed band (i.e., the added unlicensed band cell being activated) to the UE (or all UEs belonging to the unlicensed band cell (S1204). The message requesting measurement of the channel occupancy state of the unlicensed band may be an RRC message and may be transmitted to the UE via the licensed band or the unlicensed band. The RRC message may be masked (e.g., scrambled) based on a C-RNTI or U-RNTI. When the message requesting measurement of the channel occupancy state of the unlicensed band is received, the UE may measure the channel occupancy state of the unlicensed band (S1205). Alternatively, the UE may measure the channel occupancy state of the unlicensed band without the request of the base station. In this case, the step S1204 may be omitted.

The UE may measure the channel occupancy state of the unlicensed band based on the measurement period included in the measurement-related information. For example, the UE may measure strength of a signal received for a predetermined time via the unlicensed band, compare the measured strength with a predetermined threshold value (e.g., the predetermined threshold value included in the measurement-related information), and identify a signal having an intensity equal to or higher than the predetermined threshold value. The signal received via the unlicensed band for the predetermined time may not include signals scheduled by the base station. That is, the signal received via the unlicensed band for the predetermined time may be an interference signal generated by another communication node. The predetermined time may not include the time scheduled by the base station. The UE may measure the channel occupancy state (e.g., channel occupancy rate) based on the algorithm included in the measurement-related information (e.g., Equation 2).

The UE may transmit (or report) information indicating the measured channel occupancy state to the base station based on the reporting condition included in the measurement-related information. For example, the UE may transmit to the base station the information indicating the channel occupancy state based on a periodicity defined in the reporting condition. If a change between the channel occupancy state measured in the current period and the channel occupancy state measured in the previous period is equal to or greater than a predetermined threshold value (i.e., if the channel occupancy state is changed), the UE may transmit the information indicating the channel occupancy state to the base station. The UE may transmit the information indicating the channel occupancy state to the base station as follows.

The UE may transmit the information indicating the channel occupancy state to the base station in response to the RRC message. Alternatively, the UE may transmit the information indicating the channel occupancy state to the base station through a UL resource allocated by the base station. For example, the UE may request the base station to schedule a UL resource for transmission of the information indicating the channel occupancy state (S1206). If the scheduling request for the UL resource is received, the base station may allocate the UL resource to the UE. For example, the base station may transmit a UL grant to the UE (S1207). Here, the UL resource allocated to the UE may be a UL resource of the licensed band or a UL resource of the unlicensed band. The UE may transmit the information indicating the channel occupancy state to the base station through the UL resource allocated by the base station (S1208).

The base station may receive the information indicating the channel occupancy state from the UE. The base station may change the size of the contention window based on the channel occupancy state (S1209). Here, the size of the contention window may be changed every predetermined period. If the channel occupancy rate indicated by the channel occupancy state is equal to or greater than a predetermined threshold value, the base station may increase the size of the contention window. If the channel occupancy rate indicated by the channel occupancy state is less than the predetermined threshold threshold, the base station may maintain, reduce, or initialize the size of the contention window.

The base station may perform an LBT operation based on the size of the changed contention window (S1210). For example, the base station may select a backoff value in the changed contention window, and check the channel status for a time corresponding to the selected backoff value. If the channel status is an idle state, the base station may transmit a signal via the unlicensed band. The base station may also inform the UE of the changed size of the contention window.

Then, a method of changing the size of the contention window in the dynamic manner will be described. Also, the method of changing the size of the contention window to be described below may be performed in the semi-static manner as well as in the dynamic manner.

If the dynamic scheme is used, the size of the contention window may be changed based on at least one information of HARQ response (e.g., ACK, NACK, DTX, ANY), collision-aware information, data loss information, and information detected by other communication nodes. Here, the size of the contention window may be exponentially increased or decreased. Alternatively, the size of the contention window may be initialized. The size of the contention window may be set within a predetermined set of contention windows or a set of contention windows obtained via an RRC message.

Meanwhile, scenarios of collisions between signals in the unlicensed band may be as follows.

Figure 13:
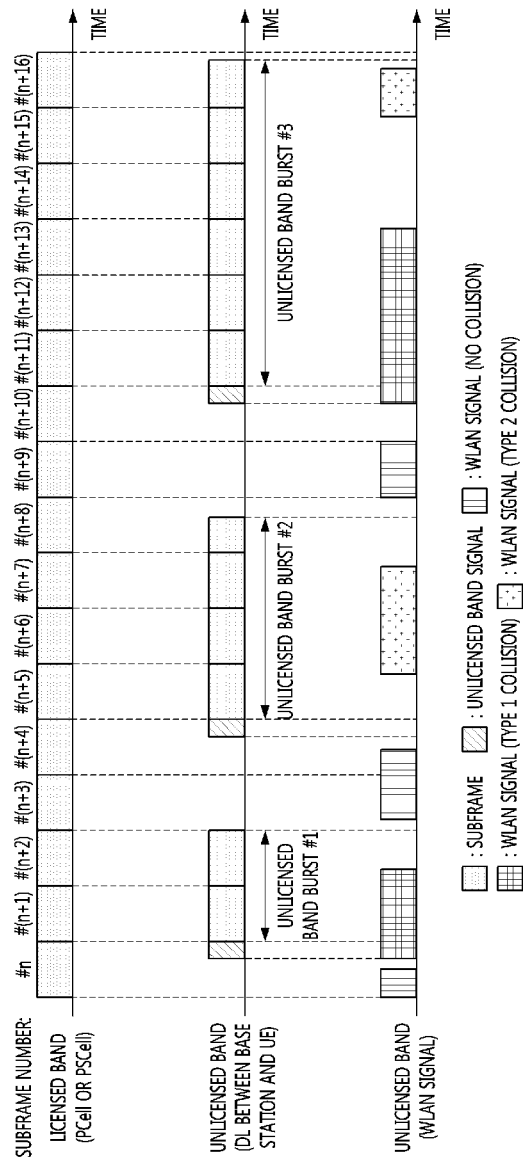
FIG. 13 is a timing diagram illustrating a first embodiment of a collision scenario in an unlicensed band.

FIG. 13 is a timing diagram illustrating a first embodiment of a collision scenario in an unlicensed band.

Referring to FIG. 13, the timing of the subframe (or slot, OFDM symbol, etc.) of the licensed band may be the same as the timing of the subframe (or slot, OFDM symbol, etc.) of the unlicensed band. A base station and a UE may support the licensed band and the unlicensed band. The base station may support carrier aggregation in the licensed band and the unlicensed band. The licensed band cell may be a primary cell (i.e., PCell) or a primary SCell (i.e., PSCell). The licensed band cell may be used for UL transmission and DL transmission. The unlicensed band cell may be used for DL transmission between the base station and the UE, and for communications between communication nodes supporting WLAN (hereinafter, referred to as 'WLAN communication nodes').

The base station may transmit an unlicensed band burst #1 in a subframe #(n+1) and a subframe #(n+2) in the unlicensed band. The unlicensed band burst #1 may collide with a WLAN signal generated by the WLAN communication node in the subframe #(n+1) and subframe #(n+2) of the unlicensed band.

The base station may transmit an unlicensed band burst #2 in subframes #(n+5) to #(n+8) of the unlicensed band. The unlicensed band burst #2 may collide with a WLAN signal generated by the WLAN communication node in the subframes #(n+5) to #(n+7) of the unlicensed band.

The base station may transmit an unlicensed band burst #3 in subframes #(n+11) to #(n+16) of the unlicensed band. Since WLAN signals generated by the WLAN communication node are transmitted in the subframe #(n+11), subframe #(n+12), subframe #(n+13), subframe #(n+15), and subframe #(n+16), the unlicensed band burst #3 may collide with the WLAN signal.

In the unlicensed band, types of collision may be classified into a type 1 collision and a type 2 collision. If a transmission time of a signal transmitted by the base station based on the LBT operation and a transmission time of a signal transmitted by the WLAN communication node based on the LBT operation are the same, a collision between signals may occur. This type of collision may be defined as the type 1 collision.

Even when the base station transmits a signal based on the LBT operation in the unlicensed band, the WLAN communication node may not be able to detect the signal transmitted from the base station due to a hidden node problem or the like. In this case, the WLAN communication node may determine that the channel status of the unlicensed band is the idle state, and thus may transmit a signal in the unlicensed band. Accordingly, the signal transmitted by the base station may collide with the signal transmitted by the WLAN communication node. This type of collision may be defined as the type 2 collision. The collision problem according to the type 2 collision may be solved through a procedure of exchanging a request-to-send (RTS) frame and a clear-to-send (CTS) frame which is specified in the WLAN standard. Also, in order to avoid the collision due to the type 2 collision, the base station may change the unlicensed band cell, or may newly configure an unlicensed band cell.

Meanwhile, the LBT operation may be performed based on an assumption that the communication node is able to detect a signal of a counterpart communication node. Thus, a collision (e.g., the type 2 collision) caused by failure to detect the signal of the counterpart communication node may not be considered for changing the size of the contention window.

Hereinafter, a method of changing the size of the contention window based on HARQ response will be described.

Figure 14:
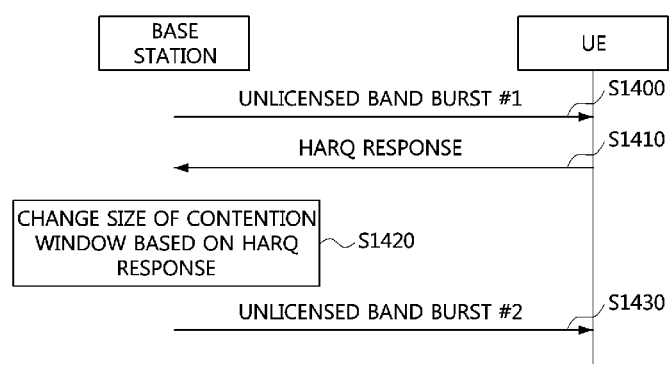
FIG. 14 is a sequence chart illustrating an exemplary embodiment of a method of changing a contention window size based on HARQ response.

FIG. 14 is a sequence chart illustrating an exemplary embodiment of a method of changing a contention window size based on HARQ response.

Referring to FIG. 14, a base station and a UE may form the wireless communication network described with reference to FIGS. 1 to 4, and may support the licensed band and the unlicensed band. The base station may support carrier aggregation in the licensed band and the unlicensed band. The base station and the UE may be configured to be the same as or similar to the communication node 500 described with reference to FIG. 5. The timing of the subframe (or slot, OFDM symbol, etc.) of the licensed band may be the same as the timing of the subframe (or slot, OFDM symbol, etc.) of the unlicensed band. A configuration of an unlicensed band burst may be the same as or similar to the configuration of the unlicensed band burst described with reference to FIG. 9. The unlicensed band burst may be scheduled based on a cross-carrier scheduling scheme or a self-carrier scheduling scheme.

The base station may transmit an unlicensed band burst #1 to the UE through the unlicensed band (S1400). The unlicensed band burst #1 may comprise a plurality of subframes. The size of a start subframe (or an end subframe) among the plurality of subframes included in the unlicensed band burst #1 may be smaller than 1 millisecond. Each of the plurality of subframes included in the unlicensed band burst #1 may include a PDSCH.

The UE may receive the unlicensed band burst #1 from the base station via the unlicensed band. The UE may transmit a HARQ response for the PDSCH included in each of the plurality of subframes included in the unlicensed band burst #1 to the base station (S1410). For example, the UE may transmit a HARQ response to the PDSCH included in a subframe #n of the unlicensed band to the base station through a subframe #(n+4) of the licensed band. If the subframe #n in the unlicensed band is a partial subframe, the UE may transmit the HARQ response for the PDSCH included in the subframe #n in the unlicensed band to the base station through a subframe #(n+5) in the licensed band.

The HARQ response may include ACK, NACK, DTX, ANY, and so on. When the PDSCH included in the subframe #n of the unlicensed band is normally received, the UE may transmit an ACK to the base station in the HARQ response. When the PDSCH included in the unlicensed band subframe #n is not normally received, the UE may transmit a NACK to the base station in the HARQ response. When an interference signal generated by another communication node is detected in the process of receiving the PDSCH included in the subframe #n of the unlicensed band, the UE may transmit a DTX to the base station in the HARQ response. Here, DTX and ANY may be regarded as NACK.

The base station may receive the HARQ response to the unlicensed band burst from the UE, and change the size of the contention window based on the HARQ response (S1420). Here, the HARQ response used to change the size of the contention window may be the HARQ response to the PDSCH scheduled by the base station. The base station may change the size of the contention window using the HARQ response for the PDSCH of the start subframe (i.e., the first subframe) among the plurality of subframes included in the unlicensed band burst among the HARQ responses.

For example, if the size of the start subframe of the unlicensed band burst is 1 ms, the base station may change the size of the contention window using only the HARQ response to the PDSCH of the start subframe of the unlicensed band burst. If the size of the start subframe of the unlicensed band burst is less than 1 ms (i.e., the start subframe is a partial subframe), the base station may change the size of the contention window by using the HARQ responses for the PDSCH of the start subframe (e.g., subframe #n) and the PDSCH of the second subframe (e.g., subframe #(n+1)). Here, the size of the second subframe of the unlicensed band burst may be 1 ms.

Alternatively, the base station may change the size of the contention window using HARQ responses for PDSCHs of all the subframes included in the unlicensed band burst.

Alternatively, the base station may change the size of the contention window by using the HARQ response to the start frame (i.e., the first subframe) and the HARQ responses to x subframes contiguous to the start subframe among the plurality of subframes included in the unlicensed band burst. Here, x may be an integer of 1 or more. x may be predetermined in the base station and the UE. Alternatively, x may be transmitted to the UE via an RRC message. Alternatively, x may be set differently for each base station (or manufacturer).

For example, if the start subframe of the unlicensed band burst is a partial subframe, x may be 1. Accordingly, the base station may use the HARQ responses for the PDSCH of the start subframe (e.g., subframe #n) and the PDSCH of the second subframe (e.g., subframe #(n+1)) of the unlicensed band burst to change the size of the competing window. Here, the size of the second subframe of the unlicensed band burst may be 1 ms.

Figure 15:
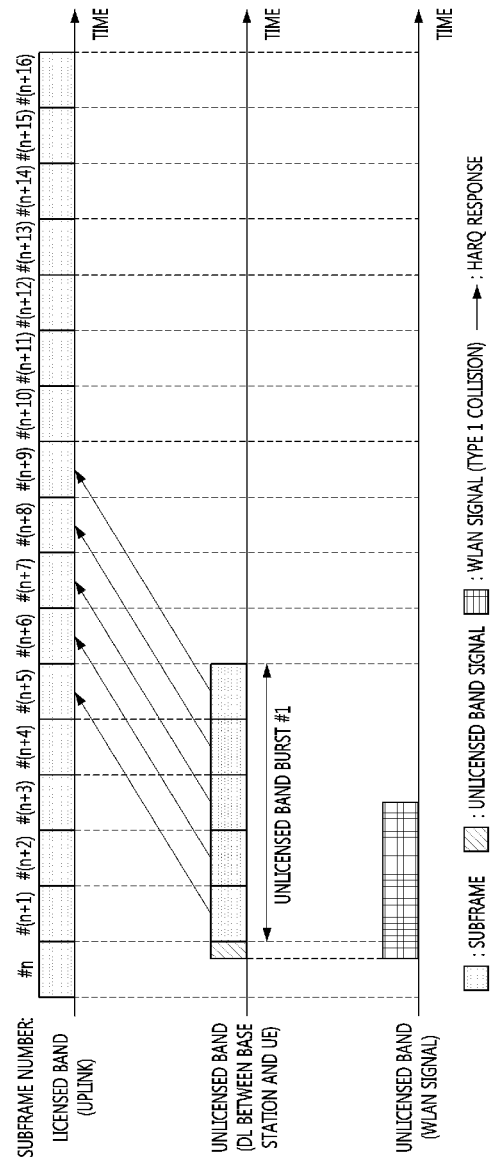
FIG. 15 is a timing diagram illustrating HARQ responses used for determining a contention window size.

FIG. 15 is a timing diagram illustrating HARQ responses used for determining a contention window size.

Referring to FIG. 15, the timing of the subframe (or slot, OFDM symbol, etc.) of the licensed band may be the same as the timing of the subframe (or slot, OFDM symbol, etc.) of the unlicensed band. A base station and a UE may support the licensed band and the unlicensed band. The base station may support carrier aggregation in the licensed band and the unlicensed band. The licensed band cell may be a primary cell (i.e., PCell) or a primary SCell (i.e., PSCell). The licensed band cell may be used for UL transmission and DL transmission. The unlicensed band cell may be used for DL transmission between the base station and the UE, and for communications between WLAN communication nodes.

The base station may transmit an unlicensed band burst #1 to the UE in subframes #(n+1) to #(n+5) of the unlicensed band. The WLAN communication node may transmit a WLAN signal in subframes #n to #(n+3) of the unlicensed band. Accordingly, a collision between the unlicensed band burst #1 and the WLAN signal may occur in the subframes #(n+1) to #(n+3) of the unlicensed band. That is, the UE may not receive the unlicensed band burst #1 in the subframes #(n+1) to #(n+3) of the unlicensed band. On the other hand, the UE may receive the unlicensed band burst #1 in the subframes #(n+4) and #(n+5) of the unlicensed band since the WLAN signal is not detected.

In this case, the UE may transmit a HARQ response (i.e., NACK, DTX or ANY) to a PPDU included in the subframe #(n+1) of the unlicensed band to the base station through a subframe #(n+5) of the licensed band. The UE may transmit a HARQ response (i.e., NACK, DTX or ANY) to a PPDU included in the subframe #(n+2) of the unlicensed band to the base station through a subframe #(n+6) of the licensed band. The UE may transmit a HARQ response (i.e., NACK, DTX or ANY) to a PPDU included in the subframe #(n+3) of the unlicensed band to the base station through a subframe #(n+7) of the licensed band. The UE may transmit a HARQ response (i.e., NACK, DTX or ANY) to a PPDU included in the subframe #(n+4) of the unlicensed band to the base station through a subframe #(n+8) of the licensed band. The UE may transmit a HARQ response (i.e., NACK, DTX or ANY) to a PPDU included in the subframe #(n+5) of the unlicensed band to the base station through a subframe #(n+9) of the licensed band.

The base station may change the size of the contention window using the HARQ response to the PPDU included in the first subframe of the unlicensed band burst (i.e., the subframe #(n+1)). Alternatively, the base station may use the HARQ responses for the PPDUs contained in all subframes (i.e., the subframes #(n+1) to #(n+5) included in the unlicensed band burst) to change the size of the contention window. Alternatively, the base station may use the PPDUs included in the first subframe (i.e., the subframe #(n+1)) of the unlicensed band burst and the HARQ responses for the PPDUs included in x subframes contiguous to the first subframe to change the size of the contention window.

Referring again to FIG. 14, a HARQ response for two codewords transmitted on a single PDSCH included in a subframe may be considered as two independent HARQ responses. Also, a bundled HARQ response for y subframes may be considered as y HARQ responses. Here, y may be an integer of 2 or more.

The base station may increase the size of the contention window when the base station receives at least one NACK (or DTX, ANY) from the UE. On the other hand, the base station may maintain, reduce, or initialize the size of the contention window when the base station fails to receive NACK (or DTX, ANY) from the UE.

Alternatively, the base station may determine a NACK ratio and percentage, a DTX ratio and percentage, an ANY ratio and percentage, a 'NACK+DTX' ratio and percentage, a 'NACK+ANY' ratio and percentage, and a 'DTX+ANY' ratio and percentage, and 'NACK+DTX+ANY' ratio and percentage.

[Equation 3]

$$NACK\ \text{ratio} = \frac{\text{The number of } NACKs}{\text{Total number of } HARQ \text{ responses}}$$

$$NACK\ \text{percentage} = \frac{\text{The number of } NACKs}{\text{Total number of } HARQ \text{ responses}} \times 100$$

$$DTX\ \text{ratio} = \frac{\text{The number of } DTXs}{\text{Total number of } HARQ \text{ responses}}$$

$$DTX\ \text{percentage} = \frac{\text{The number of } DTXs}{\text{Total number of } HARQ \text{ responses}} \times 100$$

$$ANY\ \text{ratio} = \frac{\text{The number of } ANYs}{\text{Total number of } HARQ \text{ responses}}$$

$$ANY\ \text{percentage} = \frac{\text{The number of } ANYs}{\text{Total number of } HARQ \text{ responses}} \times 100$$

$$\text{'}NACK+DTX\text{'}\ \text{ratio} = \frac{\text{The number of } (NACKs+DTXs)}{\text{Total number of } HARQ \text{ responses}}$$

$$\text{'}NACK+DTX\text{'}\ \text{percentage} = \frac{\text{The number of } (NACKs+DTXs)}{\text{Total number of } HARQ \text{ responses}} \times 100$$

$$\text{'}NACK+ANY\text{'}\ \text{ratio} = \frac{\text{The number of } (NACKs+ANYs)}{\text{Total number of } HARQ \text{ responses}}$$

$$\text{'}NACK+ANY\text{'}\ \text{percentage} = \frac{\text{The number of } (NACKs+ANYs)}{\text{Total number of } HARQ \text{ responses}} \times 100$$

$$\text{'}DTX+ANY\text{'}\ \text{ratio} = \frac{\text{The number of } (DTXs+ANYs)}{\text{Total number of } HARQ \text{ responses}}$$

$$\text{'}DTX+ANY\text{'}\ \text{percentage} = \frac{\text{The number of } (DTXs+ANYs)}{\text{Total number of } HARQ \text{ responses}} \times 100$$

$$\text{'}NACK+DTX+ANY\text{'}\ \text{ratio} = \frac{\text{The number of } (NACKs+DTXs+ANYs)}{\text{Total number of } HARQ \text{ responses}}$$

$$\text{'}NACK+DTX+ANY\text{'}\ \text{percentage} =$$
$$\frac{\text{The number of } (NACKs+DTXs+ANYs)}{\text{Total number of } HARQ \text{ responses}} \times 100$$

The base station may increase the size of the contention window if the ratio (or percentage) calculated based on Equation 3 is equal to or greater than a preset threshold value. On the other hand, the base station may maintain, reduce, or initialize the size of the contention window when the ratio (or percentage) calculated by Equation 3 is less than the preset threshold value. Also, the base station and the UE may initialize (or minimize) the size of the contention window in the following cases.

For example, the base station may initialize (or minimize) the size of the contention window when an unlicensed band burst is not generated during a predetermined time $T_{CWS\text{-}Init}$. The predetermined time $T_{CWS\text{-}Init}$ for an UL unlicensed band burst may be the same as or different from the predetermined time $T_{CWS\text{-}Init}$ for a DL unlicensed band burst. The $T_{CWS\text{-}Init}$ for the UL unlicensed band burst may be predetermined in the base station and the UE. Alternatively, the $T_{CWS\text{-}Init}$ for the UL unlicensed band burst may be transmitted to the UE via an RRC message. The UE may initialize (or minimize) the size of the contention window if scheduling information for an UL unlicensed band burst is not generated during the predetermined time $T_{CWS\text{-}Init}$.

Here, the $T_{CWS\text{-}Init}$ may be the same as a discovery reference signal (DRS) period. In this case, the UE may identify the $T_{CWS\text{-}Init}$ based on the DRS period included in an RRC message. Alternatively, the $T_{CWS\text{-}Init}$ may be set to x times the DRS period. Here, x may be a natural number equal to or greater than zero. If the DRS period is 40 ms and x is 2, the $T_{CWS\text{-}Init}$ may be set to 80 ms. x may be predetermined in the base station and the UE. Alternatively, x may be transmitted to the UE via an RRC message.

Also, if the unlicensed band cell is in the inactive state, the size of the contention window may be initialized (or minimized). For example, if the state of the unlicensed band cell transitions from the inactive state to the active state, the size of the contention window may be initialized (or minimized).

Meanwhile, if the size of the contention window is changed based on the above-described method, the base station may transmit a next unlicensed band burst (i.e., an unlicensed band burst #2) using the contention window having the changed size (S1430). If the HARQ response to the unlicensed band burst #1 fails to be identified (or demodulated) until the transmission time of the unlicensed band burst #2, the base station may transmit the unlicensed band burst #2 based on the contention window used for the transmission of the unlicensed band burst #1.

For example, in case that the unlicensed band burst #1, the unlicensed band burst #2, and the unlicensed band burst #3 are sequentially transmitted, the contention window determined based on the HARQ responses to the unlicensed band burst #1 and the unlicensed band burst #2 may be used to transmit the unlicensed band burst #3. Alternatively, the contention window determined based on the HARQ response to the unlicensed band burst #2 may be used to transmit the unlicensed band burst #3.

Then, an embodiment of a method of changing the size of the contention window based on the contention-aware information will be described. Here, the method of changing the size of the contention window may be performed in a dynamic manner.

Figure 16:
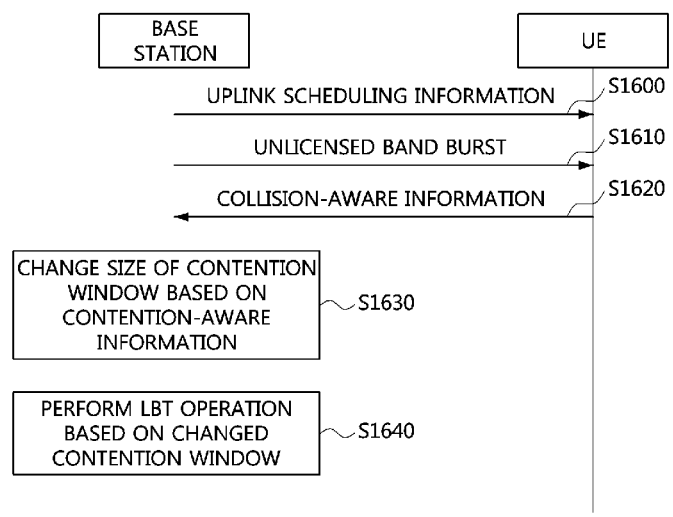
FIG. 16 is a sequence chart illustrating an exemplary embodiment of a method of changing a contention window size based on collision-aware information.

FIG. 16 is a sequence chart illustrating an exemplary embodiment of a method of changing a contention window size based on collision-aware information.

Referring to FIG. 16, a base station and a UE may form the wireless communication network described with reference to FIGS. 1 to 4, and may support the licensed band and the unlicensed band. The base station may support carrier aggregation in the licensed band and the unlicensed band. The base station and the UE may be configured to be the same as or similar to the communication node 500 described with reference to FIG. 5. The timing of the subframe (or slot, OFDM symbol, etc.) of the licensed band may be the same as the timing of the subframe (or slot, OFDM symbol, etc.) of the unlicensed band. A configuration of an unlicensed band burst may be the same as or similar to the configuration of the unlicensed band burst described with reference to FIG. 9. The unlicensed band burst may be scheduled in a cross-carrier scheduling manner or a self-carrier scheduling manner.

The base station may transmit scheduling information (e.g., uplink grant) indicating a UL resource used for transmission of the collision-aware information to the UE (S1600). The scheduling information indicating the UL resource used for transmission of the collision-aware information may be referred to as 'collision scheduling information'. The collision scheduling information may be transmitted to the UE in the licensed band (e.g., a PDCCH (or EPDCCH) of the licensed band) or the unlicensed band. The base station may transmit an unlicensed band burst to the UE in the unlicensed band (S1610). Here, the collision scheduling information and the unlicensed band burst may be transmitted based on carrier aggregation.

When a start subframe is a subframe #n among a plurality of subframes included in the unlicensed band burst, the collision scheduling information may be transmitted to the UE through a PDCCH (or EPDCCH) of a subframe #(n−1) or a subframe #n of the licensed band. The PDCCH (or EPDCCH) containing the collision scheduling information may be masked (e.g., scrambled) based on a C-RNTI, a cell common U-RNTI, or a UE-specific U-RNTI. The PDCCH (or EPDCCH) containing the collision scheduling information may be transmitted through a common search space or a UE-specific search space.

The UE may receive the collision scheduling information from the base station and identify the UL resource indicated by the received collision scheduling information. Also, the UE may receive the unlicensed band burst from the base station. The UE may transmit collision-aware information on at least one collided subframe (e.g., PDSCH of the collided subframe) among the plurality of subframes included in the unlicensed band burst to the base station (S1620). That is, the collision-aware information may be transmitted to the base station instead of the HARQ response. The collision-aware information may be transmitted through the UL resource indicated by the collision scheduling information. For example, since the unlicensed band burst #1 collides with a WLAN signal in the subframes #(n+1) to #(n+3) in FIG. 15, the UE may transmit collision-aware information on the subframes #(n+1) to #(n+3) of the unlicensed band burst #1.

The UE may transmit only collision-aware information on the first subframe among the plurality of subframes included in the unlicensed band burst to the base station. Alternatively, the UE may transmit collision-aware information on the first subframe and x sub-frames contiguous to the first subframe among the plurality of subframes included in the unlicensed band burst to the base station. Here, x may be an integer of 1 or more. x may be predetermined in the base station and the UE. Alternatively, x may be transmitted to the UE via an RRC message. The UE may transmit collision-aware information on all of the subframes included in the unlicensed band burst to the base station. Alternatively, even if there is a collided subframe, the UE may not transmit collision-aware information on the collided subframe to the base station.

Meanwhile, a specific bit, a specific sequence signal, or the like may be used as the collision-aware information. In the case that the PDCCH (or EPDCCH) containing the collision scheduling information is masked (e.g., scrambled) based on the UE-specific U-RNTI, the UE indicated by the UE-specific U-RNTI may transmit the collision-aware information. Alternatively, in the case that the PDCCH (or EPDCCH) containing the collision scheduling information is masked (e.g., scrambled) based on the cell common U-RNTI, the UE indicated by the cell common U-RNTI may transmit the collision-aware information.

Meanwhile, when the base station does not transmit the collision scheduling information, the UE may transmit the collision-aware information through a subframe of the licensed band which corresponds to the first subframe (or, second subframe) of the plurality of subframes included in the unlicensed band burst.

Figure 17:
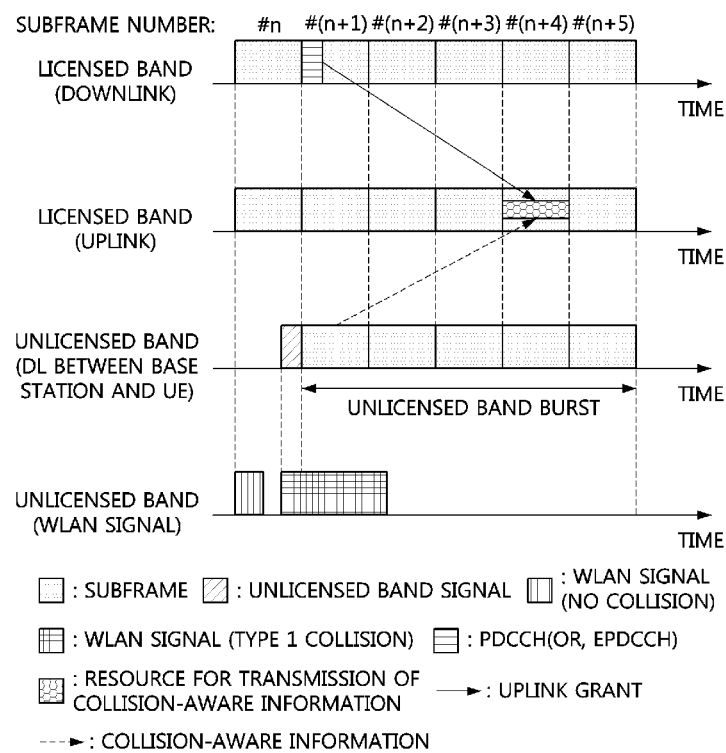
FIG. 17 is a timing diagram illustrating a first exemplary embodiment of a method of transmitting collision-aware information.

FIG. 17 is a timing diagram illustrating a first exemplary embodiment of a method of transmitting collision-aware information.

Referring to FIG. 17, the timing of the subframe (or slot, OFDM symbol, etc.) of the licensed band may be the same as the timing of the subframe (or slot, OFDM symbol, etc.) of the unlicensed band. A base station and a UE may support the licensed band and the unlicensed band. The base station may support carrier aggregation in the licensed band and the unlicensed band. The licensed band cell may be a primary cell (i.e., PCell) or a primary SCell (i.e., PSCell). The licensed band cell may be used for UL transmission and DL transmission. The unlicensed band cell may be used for DL transmission between the base station and the UE, and for communications between WLAN communication nodes.

The base station may transmit an unlicensed band burst to the UE in subframes #(n+1) to #(n+5) of the unlicensed band. Also, the base station may transmit collision scheduling information for the unlicensed band burst to the UE in a subframe #(n+1) of the licensed band. The collision scheduling information may be transmitted through a PDCCH (or EPDCCH) masked (e.g., scrambled) by a cell common U-RNTI. The PDCCH (or EPDCCH) may be transmitted through a common search space or a UE-specific search space. The UE indicated by the cell common U-RNTI may identify the collision scheduling information by receiving the PDCCH (or EPDCCH). The collision scheduling information may indicate a UL resource included in the subframe #(n+4) of the licensed band. The collision between the unlicensed band burst and the WLAN signal occurs in the subframes #(n+1) and #(n+2) of the unlicensed band, and thus the UE may transmit collision-aware information on the unlicensed band burst to the base station through the subframe #(n+4) of the licensed band.

Figure 18:
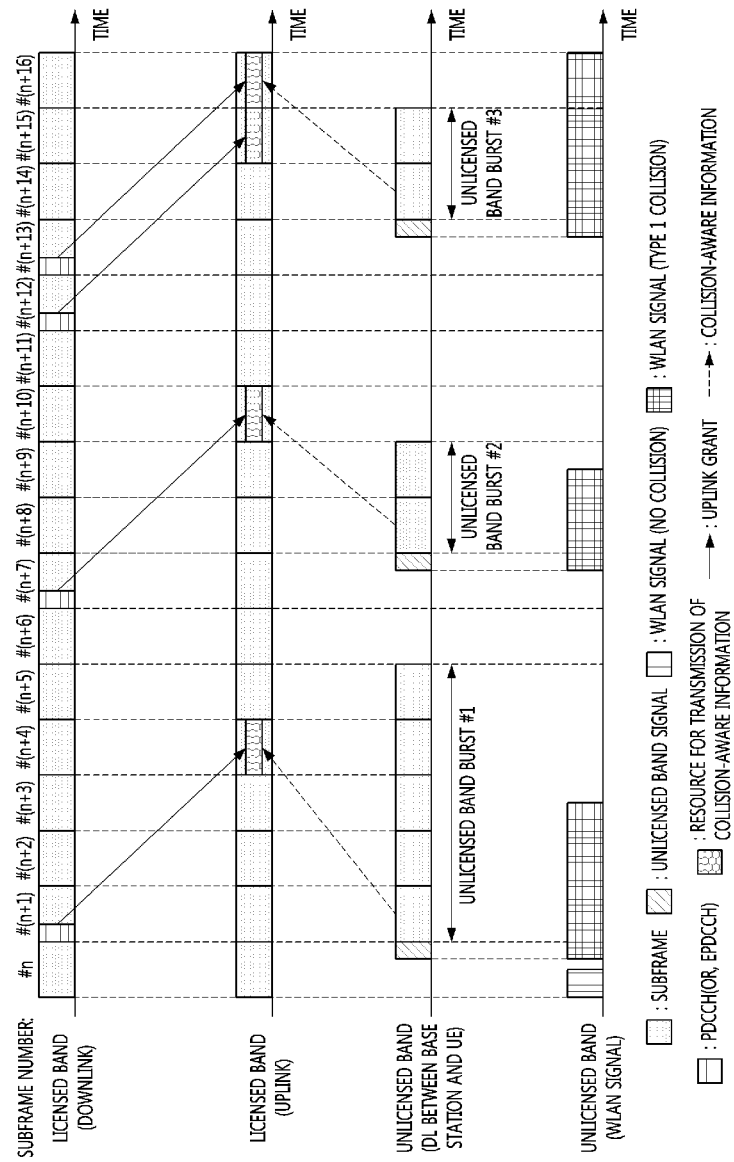
FIG. 18 is a timing diagram illustrating a second exemplary embodiment of a method of transmitting collision-aware information.

FIG. 18 is a timing diagram illustrating a second exemplary embodiment of a method of transmitting collision-aware information.

Referring to FIG. 18, the timing of the subframe (or slot, OFDM symbol, etc.) of the licensed band may be the same as the timing of the subframe (or slot, OFDM symbol, etc.) of the unlicensed band. A base station and a UE may support the licensed band and the unlicensed band. The base station may support carrier aggregation in the licensed band and the unlicensed band. The licensed band cell may be a primary cell (i.e., PCell) or a primary SCell (i.e., PSCell). The licensed band cell may be used for UL transmission and DL transmission. The unlicensed band cell may be used for DL transmission between the base station and the UE, and for communications between WLAN communication nodes.

The base station may transmit an unlicensed band burst #1 to the UE in subframes #(n+1) to #(n+5) of the unlicensed band. Also, the base station may transmit collision scheduling information for the unlicensed band burst #1 to the UE in a subframe #(n+1) of the licensed band. The collision scheduling information may be transmitted through a PDCCH (or EPDCCH) masked (e.g., scrambled) by a UE-specific U-RNTI. The PDCCH (or EPDCCH) may be transmitted through a UE-specific search space. The UE indicated by the UE-specific U-RNTI may identify the collision scheduling information by receiving the PDCCH (or EPDCCH). The collision scheduling information may indicate a UL resource included in a subframe #(n+4) of the licensed band. The collision between the unlicensed band burst and the WLAN signal occurs in the subframes #(n+1) to #(n+3) of the unlicensed band, and thus the UE may transmit collision-aware information on the unlicensed band burst #1 to the base station through the subframe #(n+4) of the licensed band.

The base station may transmit an unlicensed band burst #2 to the UE in subframes #(n+8) and #(n+9) of the unlicensed band. Also, the base station may transmit collision scheduling information for the unlicensed band burst #2 to the UE in a subframe #(n+7) (i.e., the previous subframe of the first subframe among the plurality of subframes included in the unlicensed band burst #2) of the licensed band. The collision scheduling information may be transmitted through a PDCCH (or EPDCCH) masked (e.g., scrambled) by a UE-specific U-RNTI. The PDCCH (or EPDCCH) may be transmitted through a UE-specific search space. The UE indicated by the UE-specific U-RNTI may identify the collision scheduling information by receiving the PDCCH (or EPDCCH). The collision scheduling information may indicate a UL resource included in a subframe #(n+10) of the licensed band. The collision between the unlicensed band burst #2 and the WLAN signal occurs in the subframes #(n+8) and #(n+9) of the unlicensed band, and thus the UE may transmit collision-aware information on the unlicensed band burst #2 to the base station through the subframe #(n+10) of the licensed band.

The base station may transmit an unlicensed band burst #3 to the UE in subframes #(n+14) and #(n+15) of the unlicensed band. Also, the base station may transmit collision scheduling information for the unlicensed band burst #3 to the UE in subframes #(n+12) and #(n+13) of the licensed band. The collision scheduling information may be transmitted through a PDCCH (or EPDCCH) masked (e.g., scrambled) by a UE-specific U-RNTI. The PDCCH (or EPDCCH) may be transmitted through a UE-specific search space. The UE indicated by the UE-specific U-RNTI may identify the collision scheduling information by receiving the PDCCH (or EPDCCH). The collision scheduling information transmitted through the subframe #(n+12) may indicate a UL resource included in a subframe #(n+15) of the licensed band. The collision scheduling information transmitted through the subframe #(n+13) may indicate a UL resource included in a subframe #(n+16) of the licensed band. The collision between the unlicensed band burst #3 and the WLAN signal occurs in the subframes #(n+14) and #(n+15) of the unlicensed band, and thus the UE may transmit collision-aware information on the unlicensed band burst #3 to the base station through the subframe #(n+16) indicated by the collision scheduling information included in the previous subframe (i.e., the subframe #(n+13)) of the first subframe among the plurality of subframes included in the unlicensed band burst #3.

Referring again to FIG. 16, the base station may receive the collision-aware information through the UL resource indicated by the collision scheduling information from the UE. The base station may change the size of the contention window based on the collision-aware information (S1630). For example, if at least one collision-aware information is received, the base station may increase the size of the contention window. On the other hand, if collision-aware information is not received, the base station may maintain, reduce, or initialize the size of the contention window. Here, the base station may change the size of the contention window considering only the collision-aware information for the first subframe among the plurality of subframes included in the unlicensed band burst. Alternatively, the base station may determine the size of the contention window considering the collision-aware information for the first subframe among the plurality of subframes included in the unlicensed band burst and the collision-aware information for the x subframes contiguous to the first subframe. Here, x may be an integer of 1 or more. x may be predetermined in the base station and the UE. Alternatively, x may be transmitted to the UE via an RRC message. Alternatively, the base station may change the size of the contention window considering the collision-aware information for all subframes included in the unlicensed band burst.

The base station may perform an LBT operation based on the changed contention window (S1640). For example, the base station may select a backoff value within the contention window and check a channel status for a time corresponding to the selected backoff value. If the channel status is an idle state, the base station may transmit a signal (e.g., an unlicensed band burst) over the unlicensed band. The base station may also inform the UE of the changed size of the contention window.

Then, another embodiment of a method of changing the size of the contention window based on collision-aware information will be described. Here, the method of changing the size of the contention window may be performed in a semi-static manner.

Figure 19:
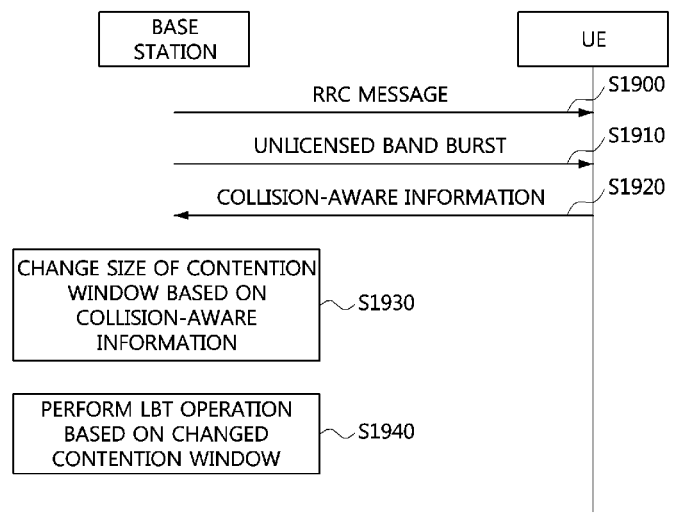
FIG. 19 is a sequence chart illustrating another exemplary embodiment of a method of changing a contention window size based on collision-aware information.

FIG. 19 is a sequence chart illustrating another exemplary embodiment of a method of changing a contention window size based on collision-aware information.

Referring to FIG. 19, a base station and a UE may form the wireless communication network described with reference to FIGS. 1 to 4, and may support the licensed band and the unlicensed band. The base station may support carrier aggregation in the licensed band and the unlicensed band. The base station and the UE may be configured to be the same as or similar to the communication node 500 described with reference to FIG. 5. The timing of the subframe (or slot, OFDM symbol, etc.) of the licensed band may be the same as the timing of the subframe (or slot, OFDM symbol, etc.) of the unlicensed band. A configuration of an unlicensed band burst may be the same as or similar to the configuration of the unlicensed band burst described with reference to FIG. 9. The unlicensed band burst may be scheduled in a cross-carrier scheduling manner or a self-carrier scheduling manner.

The base station may transmit a RRC message including the collision scheduling information to the UE (S1900). The RRC message may be transmitted to the UE via the licensed band or the unlicensed band. The collision scheduling information may indicate a PUCCH of the licensed band. The collision-aware information for the unlicensed band burst may be transmitted to the base station via the PUCCH (hereinafter referred to as 'collision PUCCH') indicated by the collision scheduling information. Also, a HARQ response to the unlicensed band burst may be transmitted to the base station via the collision PUCCH. The collision PUCCH may be configured in all subframes of the licensed band. Alternatively, the collision PUCCH may be configured according to a predetermined period. The predetermined period for the collision PUCCH may be transmitted to the UE via the RRC message.

The collision PUCCH may be configured for different UL resources for respective UEs. In this case, the UL resources may be set based on capability, information related to radio resource management (RRM), and the like of the UEs. Alternatively, the collision PUCCH may be configured for different UL resources for respective unlicensed band cells. Alternatively, the collision PUCCH may be configured in a predetermined UL resource.

The UE may receive the RRC message from the base station and identify the collision PUCCH indicated by the collision scheduling information included in the RRC message. The base station may transmit an unlicensed band burst to the UE in the unlicensed band (S1910). The UE may receive the unlicensed band burst from the base station and may identify at least one collided subframe among a plurality of subframes included in the unlicensed band burst. The UE may transmit the collision-aware information for the at least one collided subframe to the base station through the collision PUCCH (S1920). Here, a HARQ response (e.g., NACK, DTX, ANY) may be transmitted to the base station via the collision PUCCH instead of collision-aware information.

The UE may transmit only collision-aware information for the first subframe among the plurality of subframes included in the unlicensed band burst to the base station through the collision PUCCH. Alternatively, the UE may transmit the collision-aware information for the first subframe among the plurality of subframes included in the unlicensed band burst and the collision-aware information for x subframes contiguous to the first subframe. Here, x may be an integer of 1 or more. x may be preset in the base station and the UE. Alternatively, x may be transmitted to the UE via the RRC message. Alternatively, the UE may transmit collision-aware information for all subframes included in the unlicensed band burst to the base station through the collision PUCCH.

Meanwhile, in the case that the collision PUCCH is configured in different UL resources for respective UEs, information (e.g., bits, sequences, etc.) for distinguishing the unlicensed band cell in which the collided subframe is located may be configured in advance. Alternatively, the information for distinguishing the unlicensed band cell in which the collided subframe is located may be transmitted to the UE via an RRC message or DCI (e.g., CIF). In this case, the UE may transmit the collision-aware information to the base station through the collision PUCCH based on the information for distinguishing the unlicensed band cell where the collided subframe is located.

In the case that the collision PUCCH is configured in different UL resources for respective unlicensed band cells (or, in the case that the collision PUCCH is configured in a predetermined UL resource), information (e.g., bits, sequences, etc.) for distinguishing the UE that transmitted the collision-aware information may be configured in advance. Alternatively, the information for distinguishing the UE that transmitted the collision-aware information may be transmitted to the UE via an RRC message or DCI (e.g., CIF). In this case, the UE may transmit the collision-aware information to the base station through the collision PUCCH based on the information for distinguishing the UE that transmitted the collision-aware information.

Figure 20:
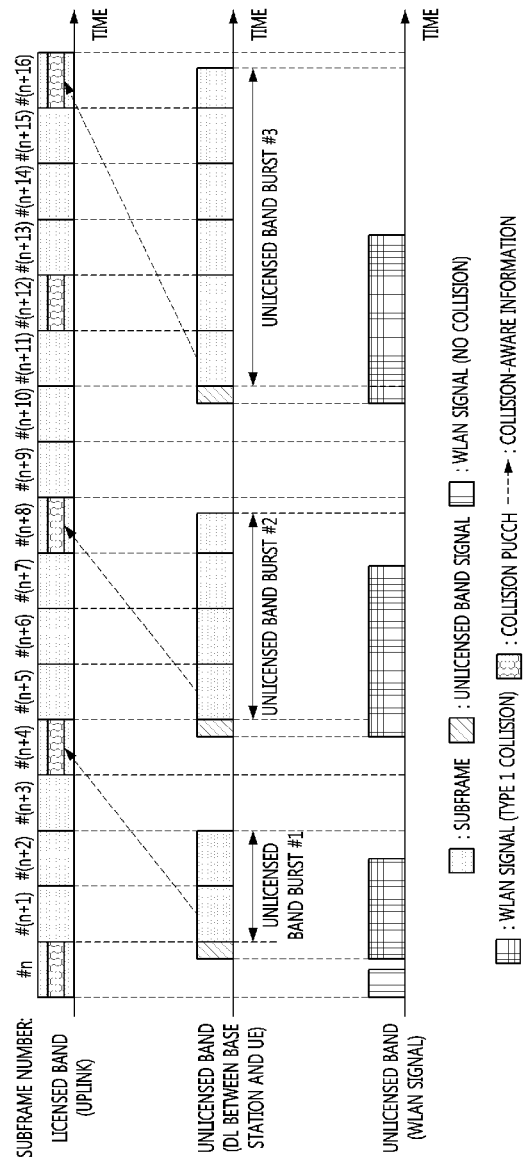
FIG. 20 is a timing diagram illustrating a third exemplary embodiment of a method of transmitting collision-aware information.

FIG. 20 is a timing diagram illustrating a third exemplary embodiment of a method of transmitting collision-aware information.

Referring to FIG. 20, the timing of the subframe (or slot, OFDM symbol, etc.) of the licensed band may be the same as the timing of the subframe (or slot, OFDM symbol, etc.) of the unlicensed band. A base station and a UE may support the licensed band and the unlicensed band. The base station may support carrier aggregation in the licensed band and the unlicensed band. The licensed band cell may be a primary cell (i.e., PCell) or a primary SCell (i.e., PSCell). The licensed band cell may be used for UL transmission and DL transmission. The unlicensed band cell may be used for DL transmission between the base station and the UE, and for communications between WLAN communication nodes.

In the licensed band, the collision PUCCH may be configured for every four subframes. For example, the collision PUCCH may be divided into a subframe #n, a subframe #(n+4), a subframe #(n+8), a subframe #(n+12), a subframe #(n+16), and the like. The base station may transmit the unlicensed band burst #1 to the UE in the subframes #(n+1) and #(n+2) of the unlicensed band. In the subframes #(n+1) and #(n+2) of the unlicensed band, the unlicensed band burst #1 may collide with the WLAN signal. Accordingly, the UE may transmit collision-aware information for the unlicensed band burst #1 to the base station via the collision PUCCH included in the subframe #(n+4) of the licensed band. In this case, the UE may transmit only the collision-aware information for the first subframe (i.e., subframe #(n+1)) among the plurality of subframes included in the unlicensed band burst #1 to the base station through the collision PUCCH included in the subframe #(n+4) of the licensed band.

The base station may transmit the unlicensed band burst #2 to the UE in the subframes #(n+5) to #(n+8) of the unlicensed band. In the subframes #(n+5) to #(n+7) of the unlicensed band, the unlicensed band burst #2 may collide with the WLAN signal. Accordingly, the UE may transmit collision-aware information for the unlicensed band burst #2 to the base station via the collision PUCCH included in the subframe #(n+8) of the licensed band. In this case, the UE may transmit only the collision-aware information for the first subframe (i.e., subframe #(n+5)) among the plurality of subframes included in the unlicensed band burst #2 to the base station through the collision PUCCH included in the subframe #(n+8) of the licensed band.

The base station may transmit the unlicensed band burst #3 to the UE in the subframes #(n+11) to #(n+16) of the unlicensed band. In the subframes #(n+11) to #(n+13) of the unlicensed band, the unlicensed band burst #3 may collide with the WLAN signal. Accordingly, the UE may transmit collision-aware information for the unlicensed band burst #3 to the base station via the collision PUCCH included in the subframe #(n+16) of the licensed band. In this case, the UE may transmit only the collision-aware information for the first subframe (i.e., subframe #(n+11)) among the plurality of subframes included in the unlicensed band burst #3 to the base station through the collision PUCCH included in the subframe #(n+16) of the licensed band.

Figure 21:
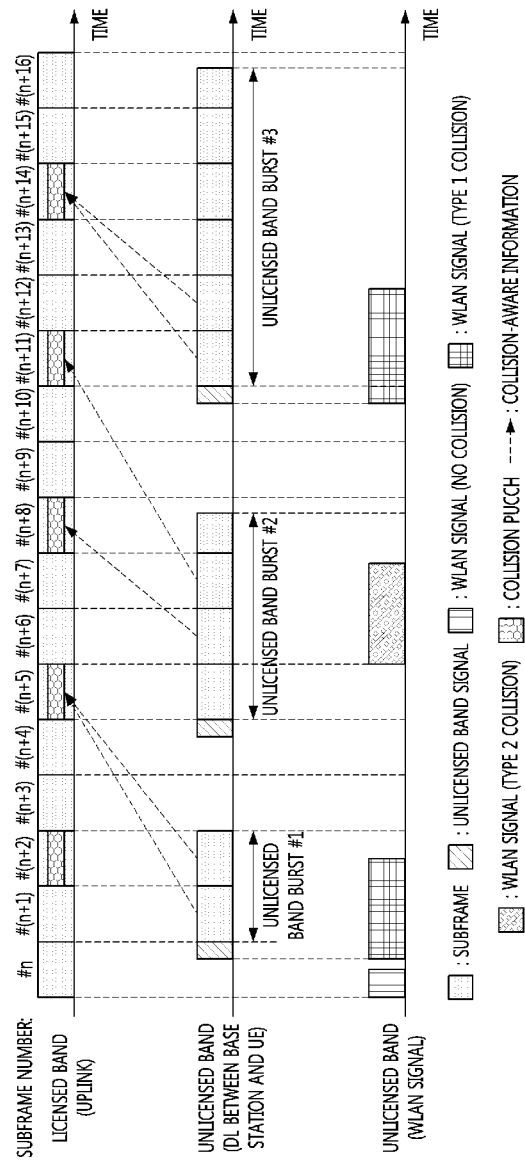
FIG. 21 is a timing diagram illustrating a fourth exemplary embodiment of a method of transmitting collision-aware information.

FIG. 21 is a timing diagram illustrating a fourth exemplary embodiment of a method of transmitting collision-aware information.

Referring to FIG. 21, the timing of the subframe (or slot, OFDM symbol, etc.) of the licensed band may be the same as the timing of the subframe (or slot, OFDM symbol, etc.)

of the unlicensed band. A base station and a UE may support the licensed band and the unlicensed band. The base station may support carrier aggregation in the licensed band and the unlicensed band. The licensed band cell may be a primary cell (i.e., PCell) or a primary SCell (i.e., PSCell). The licensed band cell may be used for UL transmission and DL transmission. The unlicensed band cell may be used for DL transmission between the base station and the UE, and for communications between WLAN communication nodes.

In the licensed band, the collision PUCCH may be configured for every three subframes. For example, the collision PUCCH may be divided into a subframe #(n+2), a subframe #(n+5), a subframe #(n+8), a subframe #(n+11), a subframe #(n+14), and the like. The base station may transmit the unlicensed band burst #1 to the UE in the subframes #(n+1) and #(n+2) of the unlicensed band. In the subframes #(n+1) and #(n+2) of the unlicensed band, the unlicensed band burst #1 may collide with the WLAN signal. Accordingly, the UE may transmit collision-aware information for each of the collided subframe #(n+1) and the collided subframe #(n+2) among the plurality of subframes included in the unlicensed band burst #1 to the base station through the collision PUCCH included in the subframe #(n+5) of the licensed band.

The base station may transmit the unlicensed band burst #2 to the UE in the subframes #(n+5) to #(n+8) of the unlicensed band. In the subframes #(n+6) and #(n+7) of the unlicensed band, the unlicensed band burst #2 may collide with the WLAN signal. Accordingly, the UE may transmit collision-aware information for the collided subframe #(n+6) among the plurality of subframes included in the unlicensed band burst #2 to the base station through the collision PUCCH included in the subframe #(n+8) of the licensed band. Also, the UE may transmit collision-aware information for the collided subframe #(n+7) among the plurality of subframes included in the unlicensed band burst #2 to the base station through the collision PUCCH included in the subframe #(n+11) of the licensed band.

The base station may transmit the unlicensed band burst #3 to the UE in the subframes #(n+11) to #(n+16) of the unlicensed band. In the subframes #(n+11) and #(n+12) of the unlicensed band, the unlicensed band burst #3 may collide with the WLAN signal. Accordingly, the UE may transmit collision-aware information for each of the collided subframe #(n+11) and the collided subframe #(n+12) among the plurality of subframes included in the unlicensed band burst #3 to the base station through the collision PUCCH included in the subframe #(n+14) of the licensed band.

Referring again to FIG. 19, the base station may receive the collision-aware information for the UE through the collision PUCCH. In the case that the collision PUCCH is configured in different UL resources for respective UEs, the base station may identify the unlicensed band cell in which the collided subframe is located by using information for distinguishing the unlicensed band cell in which the collided subframe is located. Alternatively, in the case that the collision PUCCH is configured in different UL resources for respective unlicensed band cells (or, in the case that the collision PUCCH is configured in a predetermined UL resource), the base station may identify the UE that transmitted the collision-aware information by using information for distinguishing the UE that transmitted the collision-aware information.

The base station may change the size of the contention window based on the collision-aware information (S1930). For example, if at least one collision-aware information is received, the base station may increase the size of the contention window. On the other hand, if collision-aware information is not received, the base station may maintain, reduce, or initialize the size of the contention window. Here, the base station may change the size of the contention window considering only the collision-aware information for the first subframe among the plurality of subframes included in the unlicensed band burst. Alternatively, the base station may determine the size of the contention window considering the collision-aware information for the first subframe among the plurality of subframes included in the unlicensed band burst and the collision-aware information for the x subframes contiguous to the first subframe. Here, x may be an integer of 1 or more. x may be preset in the base station and the UE. Alternatively, x may be transmitted to the UE via an RRC message. Alternatively, the base station may change the size of the contention window considering the collision-aware information for all subframes included in the unlicensed band burst.

The base station may perform an LBT operation based on the changed contention window (S1940). For example, the base station may select a backoff value within the changed contention window and check a channel status for a time corresponding to the selected backoff value. If the channel status is an idle state, the base station may transmit a signal (e.g., an unlicensed band burst) over the unlicensed band. The base station may also inform the UE of the changed size of the contention window.

Then, a method of changing the size of the contention window based on a channel occupancy state in a dynamic manner will be described.

FIG. 22 is a sequence chart illustrating a third exemplary embodiment of a method of changing a contention window size based on collision-aware information.

Referring to FIG. 22, a base station and a UE may form the wireless communication network described with reference to FIGS. 1 to 4, and may support the licensed band and the unlicensed band. The base station may support carrier aggregation in the licensed band and the unlicensed band. The base station and the UE may be configured to be the same as or similar to the communication node 500 described with reference to FIG. 5. The timing of the subframe (or slot, OFDM symbol, etc.) of the licensed band may be the same as the timing of the subframe (or slot, OFDM symbol, etc.) of the unlicensed band. A configuration of an unlicensed band burst may be the same as or similar to the configuration of the unlicensed band burst described with reference to FIG. 9. The unlicensed band burst may be scheduled in a cross-carrier scheduling manner or a self-carrier scheduling manner.

The base station may measure a channel occupancy state for a predetermined time (S2200). The predetermined time may be a time between consecutive unlicensed band bursts (e.g., a time from the end of the unlicensed band burst #n to the start of the unlicensed band burst #(n+1)), a time from the time of selecting the backoff value to the time at which the backoff value becomes zero, a time from the time of selecting the backoff value to the start of the transmission of the unlicensed band burst, etc. The channel occupancy state may indicate the number of channel occupations, the number of occupied slots, and the like.

FIG. 23 is a timing diagram illustrating a channel occupancy state of an unlicensed band.

Referring to FIG. 23, a predetermined time may be the time from an end time to of the unlicensed band burst #n to a start time ti of the unlicensed band burst #(n+1). That is, the predetermined time may be a time corresponding to 15 slots. The number of channel occupations may be 3 for the predetermined time. The number of occupied slots for the predetermined time may be 10.

Referring again to FIG. 22, the base station may change the size of the contention window based on the channel occupancy state (S2210). For example, the base station may increase the size of the contention window when the number of channel occupations is greater than or equal to a predetermined threshold value, and may maintain, reduce, or initialize the size of the contention window when the number of channel occupations is less than the predetermined threshold value. Alternatively, the base station may increase the size of the contention window when the number (or ratio) of occupied slots is greater than or equal to a predetermined threshold value, and may maintain, reduce, or initialize the size of the contention window when the number (or ratio) of occupied slots is less than the predetermined threshold value.

Alternatively, the base station may change the size of the contention window based on the amount of change between the current channel occupancy state (e.g., the number of channel occupations, the number of occupied slots, the occupied slot ratio) and the previous occupancy state of the channel (e.g., the number of channel occupations, the number of occupied slots, the occupied slot ratio). In the case that the unlicensed band burst #(n−1), the unlicensed band burst #n, and the unlicensed band burst #(n+1) are sequentially transmitted, the previous channel occupancy state may be measured during the time between the end of the unlicensed band burst #(n−1) and the start of the unlicensed band burst #n. The current channel occupancy state may be measured during the time between the end of the unlicensed band burst #n and the start of the unlicensed band burst #(n+1). The amount of change between the current channel occupancy state and the previous channel occupancy state may be calculated based on Equation 4 below.

$$\Delta_{CU,i} = CU_i - CU_{i-1}$$ [Equation 4]

Here, $\Delta_{CU,i}$ may indicate the amount of change. $CU_i$ may indicate the current channel occupancy state. $CU_{i-1}$ may indicate the previous channel occupancy state. The base station may increase the size of the contention window if $\Delta_{CU,i}$ is equal to or greater than a preset threshold value. The base station may maintain, reduce, or initialize the size of the contention window if $\Delta_{CU,i}$ is below the preset threshold value. Alternatively, the size of the contention window corresponding to the channel occupancy state may be set in advance as shown in Table 4 below.

TABLE 4

| Channel occupancy state | Size of contention window |
| --- | --- |
| $TH_0 < CU \leq TH_1$ | $CWS_0$ |
| $TH_1 < CU \leq TH_2$ | $CWS_1$ |
| $TH_2 < CU \leq TH_3$ | $CWS_2$ |
| $TH_3 < CU \leq TH_4$ | $CWS_3$ |

TH may indicate a predetermined threshold value. $TH_0$ may indicate a minimum threshold value among predetermined threshold values, and $TH_4$ may indicate a maximum threshold value among predetermined threshold values. That is, the predetermined threshold values may be increased in order of $TH_0$, $TH_1$, $TH_2$, $TH_3$ and $TH_4$. The CWS can indicate the size of the contention window. $CWS_0$ may indicate a minimum size of the contention window, and $CWS_3$ may indicate a maximum size of the contention window. That is, the sizes of the contention window may be increased in the order of $CWS_0$, $CWS_1$, $CWS_2$, and $CWS_3$.

The corresponding relationship between the channel occupancy state and the contention window is not limited to the contents described in Table 4, and may be variously set.

The base station may change the size of the contention window based on Table 4. For example, if the channel occupancy state corresponds to '$TH_1 < CU \leq TH_2$', the base station may change the size of the contention window to $CWS_1$. Alternatively, if the channel occupancy state corresponds to '$TH_3 < CU \leq TH_4$', the base station may change the size of the contention window to $CWS_3$.

Meanwhile, the base station may determine the size of the contention window for uplink transmission and the size of the contention window for downlink transmission based on the channel occupancy state. The size of the contention window for uplink transmission may be smaller than the size of the contention window for downlink transmission. The size of the contention window for uplink transmission may be indicated as a ratio to the size of the contention window for downlink transmission.

The base station may transmit contention window related information to the UE (S2220). The contention window related information (e.g., information related to the contention window for uplink transmission) may include the size of the contention window, a backoff value selected in the contention window, and the like. The contention window related information may be transmitted to the UE via an RRC message or a DCI.

Contention Window Related Information Transmission Based on RRC Message

The base station may transmit an RRC message including information indicating the size of the contention window to the UE. For example, the information indicating the size of the contention window may be transmitted in a broadcast manner through a PDCCH (or EPDCCH) masked (or scrambled) based on a U-RNTI or SI-RNTI. Also, the base station may generate a DCI including a backoff value selected in the contention window, an uplink grant, and the like, and may transmit the generated DCI to the UE. Here, the UE may receive information on the contention window, the backoff value, the uplink grant, etc. from the base station. The UE may identify an uplink resource indicated by the uplink grant and may transmit a signal through the uplink resource by performing an LBT operation based on the contention window and the backoff value.

Contention Window Related Information Transmission Based on DCI

The base station may generate a DCI including information indicating the size of the contention window, the backoff value, the uplink grant, and the like, and may transmit the generated DCI to the UE. Here, the UE may receive information on the contention window, the backoff value, the uplink grant, etc. from the base station. The UE may identify an uplink resource indicated by the uplink grant and may transmit a signal through the uplink resource by performing an LBT operation based on the contention window and the backoff value.

Meanwhile, the base station may perform an LBT operation based on the changed contention window. For example, the base station may select a backoff value within the changed contention window and check a channel status for a time corresponding to the selected backoff value. If the channel state is an idle state, the base station may transmit a signal via the unlicensed band.

Next, an embodiment of a method for changing the size of the contention window when carrier aggregation is applied in the unlicensed band (e.g., when a carrier #1, a carrier #2, and a carrier #3 are aggregated in the unlicensed band) will be described.

A communication node may perform an LBT operation in the carrier #1. Also, the communication node may perform CCA operations for a predetermined time in the carriers #2 and #3 before a transmission time of a signal (e.g., a time when the backoff value becomes 0 by the LBT operation in the carrier #1). Here, the communication node performing the LBT operation may determine that the carrier #1 is in a busy state when a received signal strength in the carrier #1 is equal to or greater than a preset threshold value. The communication node performing the LBT operation may determine that the carrier #1 is in an idle state when the received signal strength in the carrier #1 is less than the preset threshold value.

The communication node performing the CCA operations may determine that the carrier #2 (or the carrier #3) is in a busy state when a received signal strength in the carrier #2 (or the carrier #3) is equal to or greater than a preset threshold value. The communication node performing the CCA operations may determine that the carrier #2 (or the carrier #3) is in an idle state when the received signal strength in the carrier #2 (or the carrier #3) is less than the preset threshold value. Here, the preset threshold value used for the LBT operation may be the same as or different from the preset threshold value used for the CCA operations. The preset threshold value may be transmitted to the communication node via an RRC message. If the state of the carrier #2 is determined as busy by the CCA operation, an unlicensed band burst may not be transmitted through the carrier #2. In this case, the communication node may transmit an unlicensed band burst through the carriers #1 and #3.

Meanwhile, when the state of the carrier #1 is determined as busy by the LBT operation, the communication node may stop transmission attempts in all the carriers (e.g., the carrier #1, the carrier #2, and the carrier #3). In this case, the communication node may freeze the backoff value according to the LBT operation and the backoff value according to the CCA operation.

Alternatively, when it is determined that the carrier #1 is in the busy state due to the LBT operation, the communication node may determine a state of different carrier (e.g., the carrier #3) based on the backoff value according to the LBT operation in the carrier #1. Here, the different carrier may be selected from the plurality of carriers constituting the unlicensed band based on received signal strengths (e.g., received signal strength indication (RSSI)), channel occupancy states, channel state information, or the like. Alternatively, the different carrier may be set based on predetermined priorities of the carriers. The predetermined priorities of the carriers may be transmitted to the communication node via an RRC message. If the state of the different carrier is idle, the communication node may transmit an unlicensed band burst on the different carrier. That is, an unlicensed band burst may be transmitted in the different carrier (e.g., the carrier #2, the carrier #3) instead of the carrier #1.

Meanwhile, the communication node may transmit the unlicensed band burst based on a carrier aggregation of the carrier #1 determined as in the idle state by the LBT operation and the carrier #2 (or the carrier #3) determined as in the idle state by the CCA operation. The communication node may change the size of the contention window used for a next unlicensed band burst transmission if it is determined that a collision between the unlicensed band burst and another signal has occurred. For example, the communication node may change the size of the contention window based on a HARQ response (or collision-aware information) to a first subframe (or HARQ responses to the first subframe and x subframes contiguous to the first subframe among a plurality of subframes included in the unlicensed band burst, where x is an integer of 1 or more). Here, the HARQ response used for changing the size of the contention window may be at least one of NACK, DTX, and ANY.

That is, the communication node may change the size of the contention window based on the method of changing the size of the contention window described with reference to FIG. 14, the method of changing the size of the contention window described with reference to FIG. 16, or the method of changing the size of contention window described with reference to FIG. 19.

Next, another embodiment of a method for changing the size of the contention window when carrier aggregation is applied in the unlicensed band (e.g., when a carrier #1, a carrier #2, and a carrier #3 are aggregated in the unlicensed band) will be described.

A communication node may perform an LBT operation in each of a plurality of carriers (e.g., carrier #1, carrier #2) in the unlicensed band. The backoff value according to the LBT operation in the carrier #1 may be different from the backoff value according to the LBT operation in the carrier #2. In this case, the transmission time in the carrier #1 may be different from the transmission time in the carrier #2. For example, if the transmission time in the carrier #1 is earlier than the transmission time in the carrier #2, the transmission time in the carrier #1 may be delayed so that the transmission time in the carrier #1 becomes equal to the transmission time in the carrier #2. On the other hand, in a case that the carrier #1 is far away from the carrier #2 in the frequency domain, the carrier #1 may be operated independently of the carrier #2. In this case, the delay at the transmission time may not be applied. Accordingly, an unlicensed band burst may be transmitted at the transmission time of the carrier #1, and an unlicensed band burst may be transmitted at the transmission time of the carrier #2 regardless of the transmission in the carrier #1.

Meanwhile, a collision between the unlicensed band bursts transmitted from the plurality of carriers and another signal may occur. The communication node may change the size of the contention window used for transmission of a next unlicensed band burst if it is determined that a collision between the unlicensed band burst and another signal has occurred. The size of the contention window may be changed independently for respective carriers, or equally for all carriers.

Method of Independently Changing Sizes of Contention Windows for Respective Carriers The communication node may change the size of the contention window based on a HARQ response (or, collision-aware information) to a first subframe (or, the first subframe and x subframes contiguous to the first subframe among the plurality of subframes included in the unlicensed band burst transmitted from the carrier #1, where x is an integer equal to or greater than 1). Also, the communication node may change the size of the contention window based on a HARQ response (or, collision-aware information) to a first subframe (or, the first subframe and x subframes contiguous to the first subframe among the plurality of subframes included in the unlicensed band burst transmitted from the carrier #2, where x is an integer equal to or greater than 1).

Here, the size of the contention window for the carrier #1 may be changed independently of the size of the contention window for the carrier #2. Thus, the size of the contention window for the carrier #1 may be different from the size of the contention window for the carrier #2. The HARQ response used for resizing the contention window may be at least one of NACK, DTX, and ANY. The communication node may be configured to change the size of the contention window based on the method of changing the size of the contention window described with reference to FIG. 14, the method of changing the size of the contention window described with reference to FIG. 16, or the method of changing the size of the contention window described with reference to FIG. 19.

Method of Equally Changing Sizes of Contention Windows for all Carriers

The communication node may change the size of the contention window based on a HARQ response (or, collision-aware information) to a first subframe (or, the first subframe and x subframes contiguous to the first subframe, where x is an integer equal to or greater than 1) among a plurality of subframes included in the unlicensed band burst transmitted from at least one carrier. The changed contention window may be applied to all carriers (e.g., the carrier #1, the carrier #2, and the carrier #3) in the unlicensed band. Here, the HARQ response used for changing the size of the contention window may be at least one of NACK, DTX, and ANY. The communication node may be configured to change the size of the contention window based on the method of changing the size of the contention window described with reference to FIG. 14, the method of changing the size of the contention window described with reference to FIG. 16, or the method of changing the size of the contention window described with reference to FIG. 19.

Then, a method of changing the size of the contention window based on a priority class of data will be described.

The CCA operation may be classified into an initial CCA (hereinafter referred to as 'I_CCA') operation and an extended CCA (hereinafter referred to as 'E_CCA') operation. The communication node may transmit an unlicensed band burst based on the I_CCA operation and the E_CCA operation. The I_CCA operation may be performed when transmitting a first unlicensed band burst. For example, the communication node may transmit an unlicensed band burst when a channel status of the unlicensed band is idle for 25 µs. 25 µs may be the sum of the length of the short inter frame space (SIFS) defined in the WLAN standard (i.e., 16 µs) and the length of one slot (i.e., 9 µs).

If the channel status of the unlicensed band is determined as busy by the I_CCA operation, the communication node may identify the channel status of the unlicensed band based on the E_CCA operation for transmission of the unlicensed band burst. Also, when the first unlicensed band burst is transmitted, the communication node may identify the channel status of the unlicensed band based on the E_CCA operation for transmission of a next unlicensed band burst. The time during which the E_CCA operation is performed may be referred to as a deferred period (DP). The DP may be the sum of 16 µs and the length of k slots (where k is an integer of 1 or more). k may be determined based on the priority class of the data as shown in Table 5 below

TABLE 5

| Priority class | Minimum contention window | Maximum contention window | k | Maximum occupation time | Size of contention window |
|---|---|---|---|---|---|
| 1 | 3 | 7 | 1 | 2 ms | {3, 7} |
| 2 | 7 | 15 | 1 | 3 ms | {7, 15} |

TABLE 5-continued

| Priority class | Minimum contention window | Maximum contention window | k | Maximum occupation time | Size of contention window |
|---|---|---|---|---|---|
| 3 | 15 | 63 | 3 | 6 ms, 8 ms, or 10 ms | {15, 31, 63} |
| 4 | 15 | 1023 | 7 | 6 ms, 8 ms, or 10 ms | {15, 31, 63, 127, 255, 511, 1023} |

The priority class 1 may indicate data having the highest priority among the data. On the other hand, the priority class 4 may indicate the data having the lowest priority among the data. Here, the priority class 3 may indicate data to be transmitted in a best effort manner.

Data having different priority classes (e.g., data to be transmitted in a best-effort manner, voice over internet protocol (VoIP) data, etc.) may be transmitted via one unlicensed band burst. The maximum occupancy length of the unlicensed band burst may be determined based on the priority classes of the data included in the unlicensed band burst. For example, if the unlicensed band burst contains data with priority class 1 and data with priority class 4, the maximum occupancy length of the unlicensed band burst may be determined based on the priority class 1 (e.g., the relatively higher priority class). Alternatively, if the unlicensed band burst contains data with priority class 1 and data with priority class 4, the maximum occupancy length of the unlicensed band burst may be determined based on the priority class 4 (e.g., the relatively lower priority class).

Also, the contention window used for transmission of the unlicensed band burst may be determined based on the priority classes of the data contained in the unlicensed band burst. For example, if the unlicensed band burst contains data with priority class 1 and data with priority class 4, the contention window used for transmission of the unlicensed band bursts may be determined based on the priority class 1 (e.g., the relatively higher priority class). Alternatively, if the unlicensed band burst includes data having priority class 1 and data having priority class 4, the contention window used for transmission of the unlicensed band burst may be determined based on the priority class 4 (e.g., the relatively lower priority class).

Meanwhile, in the case that the size of the competitive window is changed based on the method described with reference to FIG. 14, the method described with reference to FIG. 16, or the method described with reference to FIG. 19, the size of the contention window may be changed based on the priority class of the data included in the unlicensed band burst. For example, the size of the contention window for the priority class 1 (or, 2, 3, 4) may be changed based on a HARQ response (or, collision-aware information) for the unlicensed band burst containing the data having the priority class 1 (or, 2, 3, 4).

Alternatively, when the size of the contention window is changed based on the HARQ response (or the collision-aware information) for the unlicensed band burst, the changed size of the contention window may be used for all the priority classes regardless of the priority class of the data contained in the unlicensed band burst. In this case, since the maximum size of the contention window differs for each priority class, the size of the contention window may be changed in consideration of the maximum size of the contention window.

For example, if the size of the contention window changed based on the HARQ response (or the collision-aware information) is less than or equal to the maximum size of the contention window, the contention window changed based on the HARQ response (or the collision-aware information) may be used. If the size of the contention window changed based on the HARQ response (or the collision-aware information) is equal to or larger than the maximum size of the contention window, the maximum size of the contention window may be used. In this case, if the maximum size of the contention window is used for a predetermined time, the minimum size of the contention window may be used for transmission of a next unlicensed burst. Here, the predetermined time may be transmitted to the communication node through an RRC message.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a base station in a communication network, comprising:
   transmitting, to a user equipment (UE), a plurality of physical downlink shared channels (PDSCHs) in consecutive subframes of an unlicensed band;
   receiving a plurality of hybrid automatic repeat request (HARQ) responses to the plurality of PDSCHs from the UE; and
   determining a size of a contention window (CW) based on one or more HARQ responses among the plurality of HARQ responses,
   wherein a number of HARQ responses which are used for determining the size of the CW is determined based on a size of a first subframe belonging to the consecutive subframes,
   when the size of the first subframe is 1 millisecond, the number of HARQ responses is 1, and
   when the size of the first subframe is less than 1 millisecond, the number of HARQ responses is 2.

2. The operation method according to claim 1, wherein, when the size of the first subframe is 1 millisecond, the size of the CW is determined using a first HARQ response among the plurality of HARQ responses, and the first HARQ response is a HARQ response to a first PDSCH which has been transmitted in the first subframe.

3. The operation method according to claim 1, wherein, when the size of the first subframe is less than 1 millisecond, the size of the CW is determined using a first HARQ response and a second HARQ response among the plurality of HARQ responses, the first HARQ response is a HARQ response to a first PDSCH which has been transmitted in the first subframe, and the second HARQ response is a HARQ response to a second PDSCH which has been transmitted in a second subframe belonging to the consecutive subframes.

4. The operation method according to claim 1, wherein, when each of the plurality of PDSCHs includes two codewords, two HARQ responses for the two codewords are used.

5. The operation method according to claim 1, wherein each of the plurality of HARQ responses is a bundled HARQ response for a plurality of subframes among the consecutive subframes.

6. The operation method according to claim 1, wherein the size of the CW is increased when a negative acknowledgement (NACK) ratio is equal to or greater than a predetermined threshold.

7. The operation method according to claim 1, wherein the size of the CW is decreased when a negative acknowledgement (NACK) ratio is less than a predetermined threshold.

8. The operation method according to claim 1, wherein the size of the CW is determined based on a negative acknowledgement (NACK) ratio which is a ratio of a sum of NACKs and discontinuous transmissions (DTXs).

9. The operation method according to claim 1, further comprising transmitting a PDSCH to the UE based on the changed size of the CW through the unlicensed band.

10. A base station supporting an unlicensed band, comprising a processor and a memory storing at least one instruction executed by the processor, wherein the at least one instruction is configured to:
    transmit, to a user equipment (UE), a plurality of physical downlink shared channels (PDSCH) in consecutive subframes of an unlicensed band;
    receive a plurality of hybrid automatic repeat request (HARQ) responses to the plurality of PDSCHs from the UE; and
    determine a size of a contention window (CW) based on one or more HARQ responses among the plurality of HARQ responses,
    wherein a number of HARQ responses which are used for determining the size of the CW is determined based on a size of a first subframe belonging to the consecutive subframes,
    when the size of the first subframe is 1 millisecond, the number of HARQ responses is 1, and
    when the size of the first subframe is less than 1 millisecond, the number of HARQ responses is 2.

11. The base station according to claim 10, wherein, when the size of the first subframe is 1 millisecond, the size of the CW is determined using a first HARQ response among the plurality of HARQ responses, and the first HARQ response is a HARQ response to a first PDSCH which has been transmitted in the first subframe.

12. The base station according to claim 10, wherein, when the size of the first subframe is less than 1 millisecond, the size of the CW is determined using a first HARQ response and a second HARQ response among the plurality of HARQ responses, the first HARQ response is a HARQ response to a first PDSCH which has been transmitted in the first subframe, and the second HARQ response is a HARQ response to a second PDSCH which has been transmitted in a second subframe belonging to the consecutive subframes.

13. The base station according to claim 10, wherein, when each of the plurality of PDSCHs includes two codewords, two HARQ responses for the two codewords are used.

14. The base station according to claim 10, wherein each of the HARQ responses is a bundled HARQ response for a plurality of subframes among the consecutive subframes.

15. The base station according to claim 10, wherein the size of the CW is increased when a negative acknowledgement (NACK) ratio is equal to or greater than a predetermined threshold.

16. The base station according to claim 10, wherein the size of the CW is decreased when a negative acknowledgement (NACK) ratio is less than a predetermined threshold.

17. The base station according to claim 10, wherein the size of the CW is determined based on a negative acknowledgement (NACK) ratio which is a ratio of a sum of NACKs and discontinuous transmissions (DTXs).

18. The base station according to claim 10, wherein the at least one instruction is further configured to transmit a PDSCH to the UE based on the changed size of the CW through the unlicensed band.

* * * * *